US012746842B2

(12) United States Patent
Brannan

(10) Patent No.: US 12,746,842 B2
(45) Date of Patent: Sep. 29, 2026

(54) TECHNIQUES FOR INTELLIGENT CHARGING OF SHIPPING CONTAINER POWER SUPPLIES

(71) Applicant: STATE FARM MUTUAL AUTOMOBILE INSURANCE COMPANY, Bloomington, IL (US)

(72) Inventor: Joseph Robert Brannan, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 293 days.

(21) Appl. No.: 18/142,864

(22) Filed: May 3, 2023

(65) Prior Publication Data

US 2024/0010096 A1 Jan. 11, 2024

Related U.S. Application Data

(60) Provisional application No. 63/388,918, filed on Jul. 13, 2022, provisional application No. 63/359,974, filed on Jul. 11, 2022.

(51) Int. Cl.
*B60L 53/66* (2019.01)
*B60L 53/62* (2019.01)
(Continued)

(52) U.S. Cl.
CPC ............... *B60L 53/66* (2019.02); *B60L 53/62* (2019.02); *B65D 90/48* (2013.01); *G06F 1/26* (2013.01);
(Continued)

(58) Field of Classification Search
CPC ...... B60L 53/66; B60L 53/62; B60L 2200/36; B60L 2240/667; B60L 2260/46; B60L 2260/52; B60L 53/68; B60L 2240/66; B60L 2240/68; B60L 2240/70; B60L 2260/50; B60L 2260/54; B65D 90/48;
(Continued)

(56) References Cited

U.S. PATENT DOCUMENTS

2012/0310765 A1* 12/2012 Masters ................ G06F 9/4856 709/224
2015/0149019 A1* 5/2015 Pilutti .............. G08G 1/096791 701/23
(Continued)

*Primary Examiner* — Santosh R Poudel
(74) *Attorney, Agent, or Firm* — MARSHALL, GERSTEIN & BORUN LLP

(57) ABSTRACT

Techniques are described herein for intelligent charging of shipping container power supplies. An exemplary computer-implemented method may include (1) retrieving container data that includes a power supply indication for a set of shipping containers; (2) identifying one or more shipping containers, wherein the power supply indication for each of the shipping containers indicates that the one or more shipping containers include a power supply; (3) applying a charging model to the container data to determine (i) a charging prioritization, (ii) a respective charge value, and (iii) a respective charging rate; and (4) causing each of the one or more shipping containers to receive the respective charge value at the respective charging rate in a sequential order based upon the charging prioritization for each of the shipping containers.

20 Claims, 5 Drawing Sheets

(51) Int. Cl.
*B65D 90/48* (2006.01)
*G06F 1/26* (2006.01)
*H02J 7/40* (2026.01)
*H02J 7/80* (2026.01)
*H02J 7/90* (2026.01)

(52) U.S. Cl.
CPC *H02J 7/40* (2026.01); *H02J 7/80* (2026.01); *H02J 7/933* (2026.01); *B60L 2200/36* (2013.01); *B60L 2240/667* (2013.01); *B65D 2590/0083* (2013.01)

(58) Field of Classification Search
CPC ............... B65D 2590/0083; G06F 1/26; H02J 7/00032; H02J 7/0047; H02J 7/00712
See application file for complete search history.

(56) References Cited

U.S. PATENT DOCUMENTS

| | | | | |
|---|---|---|---|---|
| 2018/0170207 | A1* | 6/2018 | Ko | B60L 58/26 |
| 2020/0254895 | A1* | 8/2020 | Kim | H02J 7/0047 |
| 2021/0125500 | A1* | 4/2021 | Mortazavi | G08G 1/0133 |
| 2021/0206286 | A1* | 7/2021 | Choi | B60L 53/66 |
| 2021/0316631 | A1* | 10/2021 | Morgan | B60L 53/62 |
| 2022/0055500 | A1* | 2/2022 | Feldman | G01C 21/3407 |
| 2023/0116469 | A1* | 4/2023 | Hau | B60L 53/66<br>320/109 |
| 2023/0174300 | A1* | 6/2023 | Flynn | B60L 58/14 |
| 2025/0273969 | A1* | 8/2025 | Riemer | H02J 7/50 |

* cited by examiner

TECHNIQUES FOR INTELLIGENT CHARGING OF SHIPPING CONTAINER POWER SUPPLIES

CROSS-REFERENCE TO RELATED APPLICATIONS

This application claims priority to U.S. Provisional Patent Application No. 63/388,918, entitled "Techniques for Intelligent Charging of Shipping Container Power Supplies," filed on Jul. 13, 2022, and to U.S. Provisional Patent Application No. 63/359,974, entitled "Techniques for Intelligent Charging of Shipping Container Power Supplies," filed on Jul. 11, 2022, the disclosures of which are hereby incorporated herein by reference.

FIELD OF THE DISCLOSURE

Techniques are disclosed for intelligent charging of power supplies, and more specifically, intelligent charging of shipping container power supplies.

BACKGROUND

Generally speaking, many shipping containers have individual/independent power supplies for refrigeration, heating, and more recently, for motors/engines to enable autonomous transportation. As a result, these shipping containers may require frequent charging in order to maintain adequate power levels. These containers may be transported without charge to reduce the risk of fire on-board transportation vessels, such that charging at least at the point of unloading is typically required.

However, not all shipping containers may require charging as urgently as others (e.g., containers with perishable food items). Moreover, shipping containers transported on a single transport vessel (e.g., a ship) may have a large variety of ending destinations, and may thereby require different levels of charge in order to reach the respective ending destinations.

Conventionally, this charging process may be performed in a first-come-first-served manner, where any prioritization is left to transportation personnel to determine manually. Consequently, shipping containers may be often miss-prioritized, charged too fast or too slowly, and inadequately or over adequately charged for any remaining transportation because the logistical considerations when determining how to optimally prioritize multiple (often dozens, hundreds, etc.) shipping containers poses a nearly impossible challenge for transportation personnel to overcome manually.

As a result, shipping containers may often arrive at their ending destinations with unnecessary excess charge, or do not make it to the ending destination before exhausting all available charge. In either case, non-optimal charging may result in less efficient transportation, wasted and/or underutilized charging resources, and/or potential harm to the power supplies (e.g., total charge expenditure or rapid/over excessive charging). Conventional techniques may also include additional inefficiencies, ineffectiveness, or other drawbacks.

SUMMARY

The present embodiments may relate to, inter alia, optimizing power supply charging for shipping containers and subsequent transportation without leaving power supplies under or overcharged. For instance, to overcome these and other issues experienced by conventional techniques, the techniques of the present embodiments automatically prioritize shipping containers for charging, and determine at what rate each respective container should be charged to optimize subsequent transportation without leaving power supplies under or over charged.

In particular, the algorithms of the present embodiments may consider factors related to each shipping container, such as container weight, remaining travel distance, number of available charging stations along an optimal route, among other factors. Moreover, the algorithms of the present embodiments may incorporate artificial intelligence (AI), or more specifically, machine learning (ML) techniques that actively adjust charging/prioritization estimations based upon various factors, such as forecasted/real-time weather, expected/real-time traffic, and others. The algorithms may accordingly charge the container only as much as necessary to complete the remaining journey and satisfy transportation guidelines/deadlines, thereby minimizing power waste, maximizing transportation efficiency, and preserving the service life of each power supply.

As an example, the algorithms of the present embodiments may receive data corresponding to a respective container that may need to autonomously travel 20 miles to its ending destination. The algorithms may determine that charging the respective container to a specific percentage (potentially with a small buffer) of the total capacity of the power supply at a particular charging rate (e.g., 7 kW or 50 kW) is sufficient for the respective container to complete the 20 mile journey based upon the weight of the container. The algorithms may then cause the respective container to receive exactly the determined amount of charging without overcharging the power supply. Therefore, each shipping container may receive precisely as much charge as necessary to complete their corresponding journeys without delay, expending all available power, or otherwise damaging the power supply.

Additionally, the algorithms may consider the present charge of every shipping container, the required delivery data (e.g., delivery deadlines, special transportation requirements, etc.) for each shipping container, and/or a load type for each shipping container or combinations thereof in order to automatically determine a charging prioritization that includes each shipping container. Containers with high priority charging requirements (e.g., refrigeration, expedited shipping, self-transportation, etc.) may receive correspondingly high priority placements within the resulting charging prioritization. For example, a first shipping container with refrigeration and expedited shipping requirements (e.g., same-day delivery) accomplished through autonomous self-transportation may receive charging immediately at a high charging rate in order to satisfy all associated requirements. By contrast, a second shipping container without refrigeration/heating and a delivery deadline that is several days away may be prioritized lower than the first shipping container and may receive charge at a slower charging rate to preserve the service life of the power supply.

In one embodiment, a computer-implemented method for intelligent charging of shipping container power supplies may be provided. The method may be implemented via one or more local or remote processors, servers, transceivers, sensors, memory units, and/or other electronic or electrical components. In one instance, the method may include (1) retrieving, by one or more processors, container data for a set of shipping containers, wherein the container data for each shipping container includes a power supply indication; (2) identifying, by the one or more processors, one or more shipping containers from the set of shipping containers, wherein the power supply indication for each of the one or more shipping containers indicates that the one or more shipping containers include a power supply; (3) applying, by the one or more processors, a charging model to the container data of the one or more shipping containers to determine (i) a charging prioritization for each of the one or more shipping containers, (ii) a respective charge value for each of the one or more shipping containers, and/or (iii) a respective charging rate for each of the one or more shipping containers; and/or (4) causing, by the one or more processors, each of the one or more shipping containers to receive the respective charge value at the respective charging rate in a sequential order based upon the charging prioritization for each of the one or more shipping containers. The method may include additional, less, or alternate actions, including those discussed elsewhere herein.

For instance, in a variation of this embodiment, the method may further include determining whether or not one of the one or more shipping containers includes an autonomous transportation module. The one of the one or more shipping containers that includes the autonomous transportation module may have a higher charging prioritization than the one or more shipping containers that do not have the autonomous transportation module.

In another variation of this embodiment, the charging model may be a machine learning (ML) model configured to receive container data and output the charging prioritization, the respective charge value, and the respective charging rate. Further, the method may further include (1) training, by the one or more processors, the ML model using (i) a plurality of training container data, (ii) a plurality of training charging prioritizations, (iii) a plurality of training charge values, and/or (iv) a plurality of training charging rates; and/or (2) applying, by the one or more processors, the ML model to the container data in order to output (i) the charging prioritization for each of the one or more shipping containers, (ii) the respective charge value for each of the one or more shipping containers, and/or (iii) the respective charging rate for each of the one or more shipping containers.

In yet another variation of this embodiment, the method may further include retrieving, by the one or more processors, container data for a set of shipping containers, wherein the container data for each shipping container includes (i) the power supply indication, (ii) a container weight value, (iii) a remaining travel distance value, (iv) an additional charging requirement indication, and/or (v) a delivery deadline value.

In still another variation of this embodiment, the method may further include calculating, by the one or more processors executing the charging model, the respective charge value based upon a remaining travel distance value corresponding to a respective shipping container of the one or more shipping containers. At least one respective charge value may be less than a maximum capacity of a respective power supply.

In yet another variation of this embodiment, the method may further include (1) retrieving, by the one or more processors, a set of travel data that includes (a) forecasted weather data, (b) real-time weather data, (c) forecasted traffic data, and/or (d) real-time traffic data; and/or (2) applying, by the one or more processors, the charging model to the container data of the one or more shipping containers and the set of travel data to determine (i) the charging prioritization for each of the one or more shipping containers, (ii) the respective charge value for each of the one or more shipping containers, and/or (iii) the respective charging rate for each of the one or more shipping containers.

In still another variation of this embodiment, the method may further include applying, by the one or more processors, the charging model to the container data of the one or more shipping containers to determine (i) the charging prioritization for each of the one or more shipping containers, (ii) the respective charge value for each of the one or more shipping containers, and/or (iii) the respective charging rate for each of the one or more shipping containers. The respective charge value may include a buffer charge value configured to enable each of the one or more shipping containers to reach a respective destination without fully draining a respective power supply.

In yet another variation of this embodiment, the method may further include (1) retrieving, by the one or more processors, a set of regional charging data for one or more charging regions that includes (a) a power generation method indication for each region, (b) a charging rate for each region, and/or (c) a charging cost for each region; and/or (2) applying, by the one or more processors, the charging model to the container data of the one or more shipping containers and the set of regional charging data to determine (i) the charging prioritization for each of the one or more shipping containers, (ii) the respective charge value for each of the one or more shipping containers, (iii) the respective charging rate for each of the one or more shipping containers, and/or (iv) an optimal route for each of the one or more shipping containers.

In still another variation of this embodiment, the method may further include: (1) retrieving, by the one or more processors, a set of transportation vehicle data based upon one or more transportation vehicles designated to transport shipping containers of the one or more shipping containers; and/or (2) applying, by the one or more processors, the charging model to the container data of the one or more shipping containers and the set of transportation vehicle data to determine (i) the charging prioritization for each of the one or more shipping containers, (ii) the respective charge value for each of the one or more shipping containers, (iii) the respective charging rate for each of the one or more shipping containers, and/or (iv) a transportation configuration for each of the one or more shipping containers.

In another embodiment, a computing device for intelligent charging of shipping container power supplies may be provided. The computing device may include: one or more local or remote processors; a networking interface; and a non-transitory computer-readable medium coupled to the one or more processors and the networking interface. The non-transitory computer-readable medium may store instructions thereon that, when executed by the one or more processors, cause the computing device to: (1) retrieve container data for a set of shipping containers, wherein the container data for each shipping container includes a power supply indication; (2) identify one or more shipping containers from the set of shipping containers, wherein the power supply indication for each of the one or more shipping containers indicates that the one or more shipping containers include a power supply; (3) apply a charging model to the container data of the one or more shipping containers to determine (i) a charging prioritization for each of the one or more shipping containers, (ii) a respective charge value for each of the one or more shipping containers, and/or (iii) a respective charging rate for each of the one or more shipping containers, and/or (4) cause each of the one or more shipping containers to receive the respective charge value at the respective charging rate in a sequential order based upon the charging prioritization for each of the one or more shipping containers. The computing device may be configured to include, and the instructions may direct, additional, less, or alternate functionality, including that discussed elsewhere herein.

For instance, in a variation of this embodiment, the instructions, when executed by the one or more processors, may further cause the computing device to: determine whether or not one of the one or more shipping containers includes an autonomous transportation module. The one of the one or more shipping containers that includes the autonomous transportation module may have a higher charging prioritization than the one or more shipping containers that do not have the autonomous transportation module.

In another variation of this embodiment, the charging model may be a machine learning (ML) model configured to receive container data and output the charging prioritization, the respective charge value, and the respective charging rate. Further, the instructions, when executed by the one or more processors, may further cause the computing device to: (1) train the ML model using (i) a plurality of training container data, (ii) a plurality of training charging prioritizations, (iii) a plurality of training charge values, and/or (iv) a plurality of training charging rates; and/or (2) apply the ML model to the container data in order to output (i) the charging prioritization for each of the one or more shipping containers, (ii) the respective charge value for each of the one or more shipping containers, and/or (iii) the respective charging rate for each of the one or more shipping containers.

In yet another variation of this embodiment, the instructions, when executed by the one or more processors, may further cause the computing device to: retrieve container data for a set of shipping containers, wherein the container data for each shipping container includes (i) the power supply indication, (ii) a container weight value, (iii) a remaining travel distance value, (iv) an additional charging requirement indication, and/or (v) a delivery deadline value.

In still another variation of this embodiment, the instructions, when executed by the one or more processors, may further cause the computing device to: calculate, by executing the charging model, the respective charge value based upon a remaining travel distance value corresponding to a respective shipping container of the one or more shipping containers. At least one respective charge value may be less than a maximum capacity of a respective power supply.

In yet another variation of this embodiment, the instructions, when executed by the one or more processors, may further cause the computing device to: (1) retrieve a set of travel data that includes (a) forecasted weather data, (b) real-time weather data, (c) forecasted traffic data, and/or (d) real-time traffic data; and/or (2) apply the charging model to the container data of the one or more shipping containers and the set of travel data to determine (i) the charging prioritization for each of the one or more shipping containers, (ii) the respective charge value for each of the one or more shipping containers, and/or (iii) the respective charging rate for each of the one or more shipping containers.

In still another variation of this embodiment, the instructions, when executed by the one or more processors, may further cause the computing device to: (1) apply the charging model to the container data of the one or more shipping containers to determine (i) the charging prioritization for each of the one or more shipping containers, (ii) the respective charge value for each of the one or more shipping containers, and/or (iii) the respective charging rate for each of the one or more shipping containers. The respective charge value may include a buffer charge value configured to enable each of the one or more shipping containers to reach a respective destination without fully draining a respective power supply.

In yet another variation of this embodiment, the instructions, when executed by the one or more processors, may further cause the computing device to: (1) retrieve a set of regional charging data for one or more charging regions that includes (a) a power generation method indication for each region, (b) a charging rate for each region, and/or (c) a charging cost for each region; and/or (2) apply the charging model to the container data of the one or more shipping containers and the set of regional charging data to determine (i) the charging prioritization for each of the one or more shipping containers, (ii) the respective charge value for each of the one or more shipping containers, (iii) the respective charging rate for each of the one or more shipping containers, and/or (iv) an optimal route for each of the one or more shipping containers.

In still another variation of this embodiment, the instructions, when executed by the one or more processors, may further cause the computing device to: (1) retrieve a set of transportation vehicle data based upon one or more transportation vehicles designated to transport shipping containers of the one or more shipping containers; and/or (2) apply the charging model to the container data of the one or more shipping containers and the set of transportation vehicle data to determine (i) the charging prioritization for each of the one or more shipping containers, (ii) the respective charge value for each of the one or more shipping containers, (iii) the respective charging rate for each of the one or more shipping containers, and/or (iv) a transportation configuration for each of the one or more shipping containers.

In yet another embodiment, a tangible, non-transitory computer-readable medium storing instructions for intelligent charging of shipping container power supplies may be provided. When executed by one or more processors of a computing device, the instructions may cause the computing device to: (1) retrieve container data for a set of shipping containers, wherein the container data for each shipping container includes a power supply indication; (2) identify one or more shipping containers from the set of shipping containers, wherein the power supply indication for each of the one or more shipping containers indicates that the one or more shipping containers include a power supply; (3) apply a charging model to the container data of the one or more shipping containers to determine (i) a charging prioritization for each of the one or more shipping containers, (ii) a respective charge value for each of the one or more shipping containers, and/or (iii) a respective charging rate for each of the one or more shipping containers; and/or (4) cause each of the one or more shipping containers to receive the respective charge value at the respective charging rate in a sequential order based upon the charging prioritization for each of the one or more shipping containers. The instructions may direct additional, less, or alternate functionality, including that discussed elsewhere herein.

For instance, in a variation of this embodiment, the charging model may be a machine learning (ML) model configured to receive container data and output the charging prioritization, the respective charge value, and the respective charging rate. Further, the instructions, when executed by the one or more processors, may further cause the computing device to: (1) train the ML model using (i) a plurality of training container data, (ii) a plurality of training charging prioritizations, (iii) a plurality of training charge values, and/or (iv) a plurality of training charging rates; and/or (2) apply the ML model to the container data in order to output (i) the charging prioritization for each of the one or more shipping containers, (ii) the respective charge value for each of the one or more shipping containers, and/or (iii) the respective charging rate for each of the one or more shipping containers.

This summary is provided to introduce a selection of concepts in a simplified form that are further described in the Detailed Description. This summary is not intended to identify key features or essential features of the claimed subject matter, nor is it intended to be used to limit the scope of the claimed subject matter.

Advantages will become more apparent to those of ordinary skill in the art from the following description of the preferred aspects, which have been shown and described by way of illustration. As will be realized, the present aspects may be capable of other and different aspects, and their details are capable of modification in various respects. Accordingly, the drawings and description are to be regarded as illustrative in nature and not as restrictive.

Figure 1:
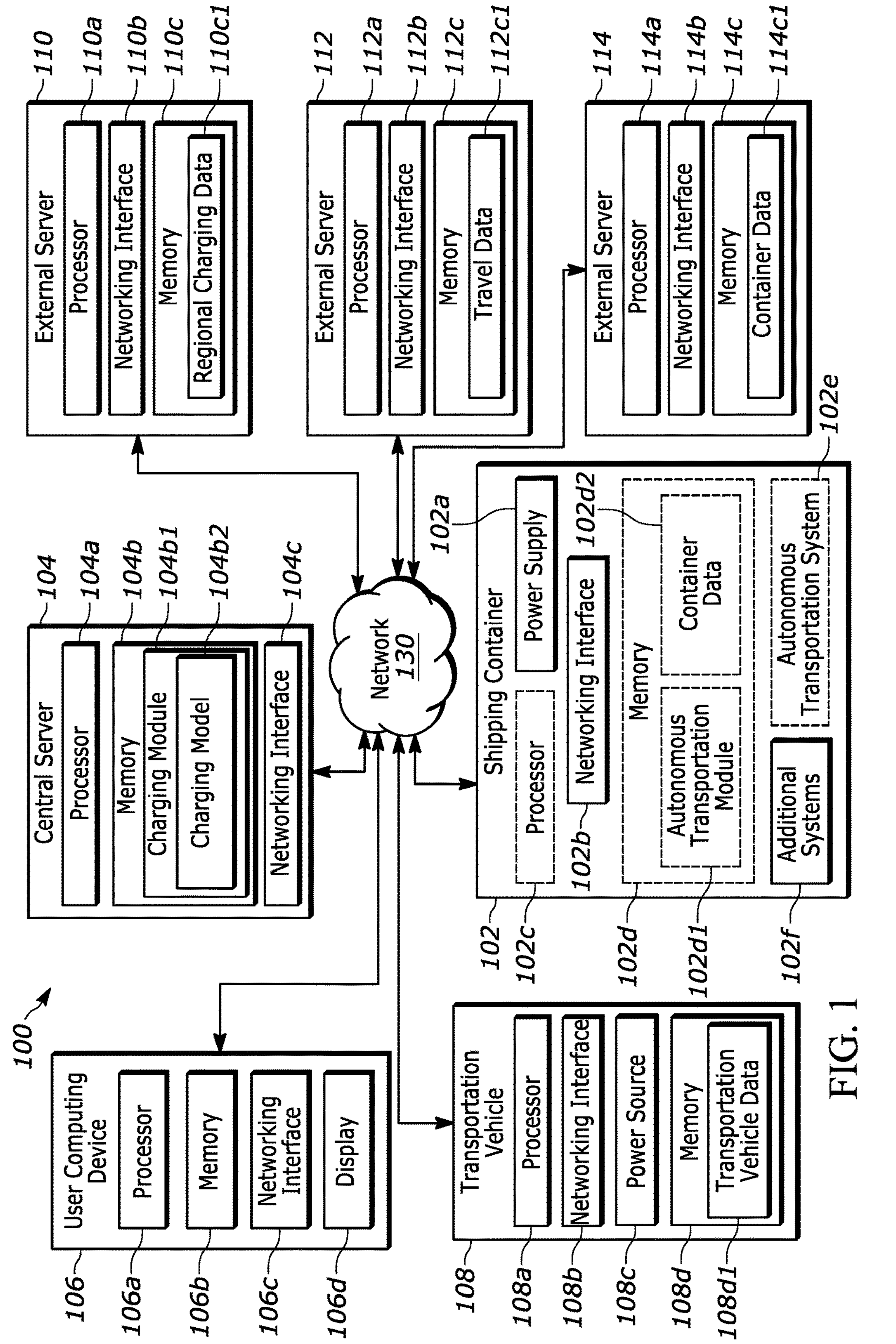
FIG. 1 depicts an exemplary computing system for intelligent charging of shipping container power supplies, in accordance with various embodiments described herein.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Techniques, systems, apparatuses, components, devices, and methods are disclosed for, inter alia, intelligent charging of shipping container power supplies. Namely, the present techniques automatically prioritize shipping containers for charging, and at what rate each respective container should be charged to optimize subsequent transportation without leaving power supplies under or over charged. The algorithms of the present embodiments may consider factors related to each shipping container, such as container weight, remaining travel distance, number of available charging stations along an optimal route, among other factors. Moreover, the algorithms may incorporate artificial intelligence (AI), or more specifically, machine learning (ML) techniques that actively adjust charging/prioritization estimations based upon various factors, such as forecasted/real-time weather, expected/real-time traffic, and others. The algorithms may accordingly charge the container only as much as necessary to complete the remaining journey, thereby minimizing power waste, maximizing transportation efficiency, and preserving the service life of each power supply.

In some embodiments, the techniques of the present disclosure may additionally include charging power supplies of shipping containers using excess power generated by the transportation vehicle (e.g., trains). These embodiments of the present disclosure include the ability for train "cars" to charge shipping containers using regenerative braking and/or other aspects of rail travel. The present algorithms may determine how and when individual train cars carrying shipping containers should charge those containers along the route. Accordingly, the present algorithms may determine which shipping containers get charging priority and when to stop charging based upon requirements such as container weight, remaining travel distance, etc.

Based upon those determinations, the present algorithms may then cause excess power generated by the transportation vehicle's power source to be diverted to each shipping container requiring charging. In some aspects, the power source of the transportation vehicle may be diesel, electric, nuclear, solar, and/or any other suitable power source or combinations thereof. For example, it is conceivable that future rail travel will be more/primarily electric, and this would likely include a hybrid or all electric train system. As the train brakes along the route (e.g., during a downhill portion), the electric systems of the train may store energy through regenerative braking for future use. The algorithms may prioritize energy stored through such regenerative braking to be prioritized for specific shipping containers with high priority charging requirements.

As another example, the algorithms of the present embodiments may designate certain shipping containers to have solar panels affixed to the top in order to passively generate electricity during transit that may be distributed to other shipping containers based upon the determined charging priority. In this example, the algorithms may also designate the solar panel containers in a manner indicating that other containers should not be stacked on the solar panel containers to allow the solar panels to generate electricity and to avoid damaging the solar panels. In this manner, the algorithms of the present embodiments may intelligently allocate and utilize solar panels to charge shipping containers as the containers and panels are transported to various destinations.

In some embodiments, the techniques of the present disclosure may be additionally configured to minimize the charging cost of charging shipping container power supplies. Generally speaking, it is conceivable that a shipping container will have many different charging options and costs associated with its travel from, for example, a port in California to the Midwest. Namely, the California port charging when the shipping container is initially dropped off may be 25 cents per kWh, but the electricity available on the transportation rail in California may cost only 20 cents per kWh and only 15 cents per kWh in Utah. The algorithms of the present embodiments may determine the most efficient and cost-effective manner to charge each shipping container power supply based upon three primary criteria: (1) the required amount of power each shipping container power supply needs, (2) charging zones in which each shipping container will travel, and (3) how much power each shipping container power supply can receive in each charging zone. Based upon these determinations, the algorithms of the present disclosure may also determine/suggest optimal transportation routes (also referenced herein as "optimal routes") that may minimize the overall charging cost for the respective shipping containers. Additionally, or alternatively, the algorithms of the present disclosure may determine the optimal routes based upon forecasted/real-time weather and/or traffic data along various route options.

In some aspects, the algorithms of the present embodiments may determine how much power each shipping container can receive in each charging zone based upon the optimal/chosen transportation route for each shipping container. For example, a first shipping container may spend 2 hours in a first charging zone where electricity is 20 cents per kWh and 1 hour in a second charging zone where electricity is 10 cents per kWh. The algorithms may therefore prioritize charging the first shipping container power supply in the second charging zone to minimize the overall cost of charging the first shipping container power supply. If the algorithms determine (based upon the speed of the transportation vehicle, etc.) that the first shipping container power supply is unable to receive the requisite amount of power in the second charging zone, the algorithms may cause the first shipping container power supply to receive power in the first charging zone until the first shipping container power supply receives the requisite amount of power.

Additionally, in certain aspects, the algorithms of the present embodiments may prioritize and/or otherwise incentivize renewable energy sources as part of the overall charging cost determination. For example, the algorithms may consider a first transportation route that features renewable energy electricity sources during 75% of the trip and a second transportation route that features renewable energy electricity sources during 25% of the trip. The first transportation route may also slightly increase the distance each shipping container is transported relative to the second transportation route. However, these renewable energy electricity sources may have a reduced cost (e.g., 50% premium) relative to non-renewable sources, such that the algorithms of the present embodiments may suggest the first transportation route in favor of such renewable energy electricity sources to reduce the overall charging cost.

Therefore, in accordance with the above, and with the disclosure herein, the present disclosure includes improvements in computer functionality or in improvements to other technologies at least because the present disclosure describes that, e.g., shipping containers and their related power supplies and other various components, may be improved or enhanced with the disclosed intelligent charging systems and methods that provide intelligent charging for such shipping containers and power supplies. That is, the present disclosure describes improvements in the functioning of a shipping container power supply and the corresponding charging power sources itself or "any other technology or technical field" (e.g., the shipping/transportation field) because the disclosed intelligent charging systems and methods improve and enhance the operation of power supplies by introducing a charging model that determines how and when to charge power supplies in a manner that is unachievable using conventional systems and methods. This improves over the prior art at least because such conventional systems were error-prone, as they lack the ability for accurately and efficiently determining how and when to charge power supplies.

Moreover, the present disclosure includes effecting a transformation or reduction of a particular article to a different state or thing, e.g., transforming or reducing the charging and/or transportation of a shipping container with a power supply from a non-optimal or error state to an optimal state.

Still further, the present disclosure includes specific features other than what is well-understood, routine, conventional activity in the field, or adding unconventional steps that demonstrate, in various embodiments, particular useful applications, e.g., applying, by one or more processors, a charging model to container data of one or more shipping containers to determine (i) a charging prioritization for each of the one or more shipping containers, (ii) a respective charge value for each of the one or more shipping containers, and/or (iii) a respective charging rate for each of the one or more shipping containers.

Exemplary System for Intelligent Charging of Shipping Container Power Supplies FIG. 1 depicts an exemplary computing system 100 for intelligent charging of shipping container power supplies, in accordance with various embodiments described herein. Depending on the embodiment, the system 100 may calculate/determine a charging prioritization, a charge value, a charging rate, an optimal route, and/or a transportation configuration or any other values or combinations thereof. A shipping container 102 may arrive at a transportation hub (e.g., a shipping port), and the central server 104 may proceed to determine multiple values related to the charging/transportation of the shipping container 102. It should be appreciated that, while the shipping container 102 is illustrated in FIG. 1 as a single shipping container, the exemplary computing system 100 may include multiple (e.g., dozens, hundreds, thousands) shipping containers 102 connected to the network 130 at any given time.

In particular, the shipping container 102 may include a power supply 102*a*, a networking interface 102*b*, and one or more processors 102*c*, one or more memories 102*d*, an autonomous transportation system 102*e*, and/or additional systems 102*f*. The one or more memories 102*d* may also include an autonomous transportation module 102*d*1 and container data 102*d*2. Generally speaking, the shipping container 102 may be or include a container used to transport goods, materials, and/or any other suitable cargo. The shipping container 102 may generally arrive at a transportation hub (e.g., a port) where the shipping container 102 is unloaded and scanned by transportation personnel. These personnel may utilize a user computing device 106 in order to scan a barcode or other indicia (e.g., quick response (QR) code) associated with the shipping container 102 upon arrival in order to document/log the journey of the shipping container 102.

Once shipping personnel have scanned and/or otherwise logged the arrival of the shipping container 102, the personnel may offload the shipping container 102 for further transportation. The shipping container 102 may require transportation from a transportation vehicle 108, but in certain instances, the shipping container 102 may be configured to autonomously transport itself to a subsequent destination. In these instances, the shipping container 102 may additionally include the one or more processors 102*c*, the one or more memories 102*d*, the autonomous transportation module 102*d*1, the container data 102*d*2, and the autonomous transportation system 102*e*. The shipping container 102 may utilize the one or more processors 102*c* to execute the autonomous transportation module 102*d*1 stored in the one or more memories 102*d*, and thereby cause the autonomous transportation system 102*e* to transport the shipping container 102 to a subsequent destination.

More specifically, the shipping container 102 may receive and/or otherwise access navigation instructions configured to enable the processor(s) 102*c* to execute the autonomous transportation module 102*d*1 and cause the autonomous transportation system 102*e* to transport the container 102 to a subsequent destination. The autonomous transportation module 102*d*1 may include executable instructions that, when executed by the one or more processors 102*c*, may cause the autonomous transportation system 102*e* components to perform actions configured to autonomously transport the shipping container 102 to a subsequent destination. The autonomous transportation system 102*e* may include components such as a motor/engine, wheels, axels, steering components, brakes, sensors (e.g., cameras, LIDAR, radar, IR sensors, microphone, etc.), a positioning system (e.g., GPS), a routing/mapping system, and/or any other suitable components configured to autonomously transport the container 102 to a subsequent destination. The autonomous transportation system 102*e* may draw power from the power supply 102*a* in order to drive the motor/engine and other corresponding components.

In other instances, the shipping container 102 includes additional systems 102*f* that require power from the power supply 102*a*. For example, the shipping container 102 may include contents requiring refrigeration (e.g., perishable foods), and the additional systems 102*f* may include refrigeration components configured to refrigerate the contents of the shipping container 102. These refrigeration components of the additional systems 102*f* may draw power from the power supply 102*a* to continually provide refrigeration to the shipping container 102 contents while the container 102 is in transit.

However, regardless of the system drawing power from the power supply 102*a*, the power supply 102*a* requires adequate charging to ensure that the systems (e.g., autonomous transportation system 102*e*, additional systems 102*f*) can perform the desired actions (e.g., transportation, heating, cooling, etc.). In order to facilitate charging of the power supply 102*a*, the shipping container 102 may communicate with the central server 104 through the network 130 via the networking interface 102*b*. The shipping container 102 may transmit the container data 102*d*2 indicating, for example, whether or not the shipping container 102 includes a power supply 102*a* (e.g., a "power supply indication"), a current charge of the power supply 102*a*, a current weight of the container 102, a delivery destination of the shipping container 102, a delivery date of the shipping container 102, one or more transportation routes to the delivery destination, and/or any other suitable information or combinations thereof. Additionally, or alternatively, when shipping personnel log the arrival of the shipping container 102 (e.g., barcode scan, QR code scan, manual entry of shipping container 102 identification information, etc.), the user computing device 106 may communicate with the central server 104 through the network 130 via the networking interface 106*c*.

The networking interface 102*b* may enable the shipping container 102 to communicate with the central server 104, the user computing device 106, the transportation vehicle 108, the external servers 110, 112, 114, and/or any other suitable devices or combinations thereof. More specifically, the networking interface 102*b* enables the shipping container 102 to communicate with each component of the exemplary computing system 100 across the network 130 through their respective networking interfaces 104*c*, 106*c*, 108*b*, 110*b*, 112*b*, 114*b*. The networking interface 102*b* may support wired or wireless communications, such as USB, Bluetooth, Wi-Fi Direct, Near Field Communication (NFC), etc. The networking interface 102*b* may allow the shipping container 102 to communicate with the various components of the exemplary computing system 100 via a wireless communication network such as a fifth-, fourth-, or third-generation cellular network (5G, 4G, or 3G, respectively), a Wi-Fi network (802.11 standards), a WiMAX network, a wide area network (WAN), a local area network (LAN), etc.

In any event, when the central server 104 receives container data 102*d*2 from the shipping container 102 and/or information from the user computing device 106, the central server 104 may proceed to determine a charging prioritization, a charge value, and/or a charging rate for the shipping container 102. However, as an initial step, the central server 104 may analyze the power supply indication included as part of the container data 102*d*2 to evaluate whether or not the shipping container 102 includes a power supply 102*a*. If the power supply indication indicates that the shipping container 102 does not include a power supply 102*a*, then the central server 104 may not determine a charging prioritization, a charge value, a charging rate, an optimal route, and/or a transportation configuration for the shipping container 102.

On the other hand, if the power supply indication indicates that the shipping container 102 does include the power supply 102*a*, then the central server 104 may apply a charging model 104*b*2 to the container data 102*d*2 in order to determine the charging prioritization, the charge value, the charging rate, the optimal route, and/or the transportation configuration for the shipping container 102. Generally speaking, the charging model 104*b*2 may be stored in memory 104*b* as part of a charging module 104*b*1 that is or includes computing instructions that are executable by the processor 104*a*. When the processor 104*a* executes the computing instructions, the charging model 104*b*2 may cause the processor 104*a* to receive container data (e.g., container data 102*d*2) as input and to output the charging prioritization, the charge value, the charging rate, the optimal route, and/or the transportation configuration based upon the container data 102*d*2.

The charging prioritization may generally indicate when a respective shipping container (e.g., shipping container 102) should receive charging relative to other shipping containers and/or other devices that require charging. The charging model 104*b*2 may determine the charging prioritization based upon the container data (e.g., container data 102*d*2). More specifically, the charging model 104*b*2 may analyze the container data 102*d*2 to determine a delivery date of the shipping container 102, components of the container 102 requiring power (e.g., autonomous transportation system 102*e*, additional systems 102*f*), remaining travel distance/time of the container 102, a weight of the container 102 and the contents stored therein, charging stations and/or otherwise charging options available along the remaining route of the container 102, and/or any other suitable data/information or combinations thereof that are included as part of and/or determined from the container data 102*d*2. The charging model 104*b*2 may then compare this data/information of the shipping container 102 to the analogous data/information of other shipping containers included as part of the shipment including the container 102 and/or containers on other shipments and/or containers currently charging or awaiting charging at the arrival location (e.g., the shipping port). The charging prioritization may be and/or include a single numerical value (e.g., 1, 2, 3, etc.), a confidence interval, a percentage (e.g., 95%, 50%, etc.) indicative of a portion of the shipment with a higher/lower charging priority than the shipping container 102, an alphanumerical character(s) (e.g., A, B, C, etc.), a symbol, and/or any other suitable value or indication.

For example, the shipping container 102 may arrive at a port as part of a large shipment including dozens/hundreds of containers, and shipping personnel may scan and/or otherwise identify each container that is included as part of the shipment. In this example, the container data **102*d*2 of the shipping container 102 may indicate a delivery date that is one week from the arrival date of the container 102 at the port and a remaining delivery distance of five miles from the port to the delivery destination. Further, several other shipping containers included as part of the shipment have container data indicating sooner delivery dates and longer remaining delivery distances than the shipping container 102**.

Continuing this example, the central server 104 may receive the container data **102*d*2 associated with the container 102 and respective container data associated with each other container that is part of the shipment. The central server 104 may then apply the charging model 104*b*2 to the set of container data that corresponds to the shipment, and the model 104*b*2 may determine charging prioritizations for each shipping container included in the shipment that requires charging. Accordingly, the charging model 104*b*2 may determine a relatively low charging prioritization for the shipping container 102 because the delivery date and remaining delivery distance of the shipping container 102 do not indicate that the power supply 102*a*** requires immediate charging relative to the power supplies of several other containers included as part of the shipment.

Of course, in certain instances, a shipping port and/or other location may have multiple charging stations, such that multiple shipping container power supplies may be charged simultaneously. Therefore, in these instances, multiple shipping containers may have identical charging prioritizations. For example, if a port or other location has four charging stations, then a first set of four shipping containers requiring the most immediate charging of the integrated power supply may receive an identical highest charging prioritization. Continuing this example, a second set of four shipping containers that require less immediate charging than the first set of four shipping containers but require more immediate charging than the remaining shipping containers may receive an identical high charging prioritization that has lower priority than only the highest charging prioritization of the first set of four shipping containers.

The charge value may generally indicate how much charge a power supply (e.g., power supply **102*a*) of a respective shipping container (e.g., shipping container 102) should receive. The charging model 104*b*2 may determine the charge value based upon the container data (e.g., container data 102*d*2). More specifically, the charging model 104*b*2 may analyze the container data 102*d*2 to determine components of the container 102 requiring power (e.g., autonomous transportation system 102*e*, additional systems 102*f*), a weight of the container 102 and the contents stored therein, remaining travel distance/time of the container 102, charging stations and/or otherwise charging options available along the remaining route of the container 102, a delivery date of the shipping container 102, and/or any other suitable data/information or combinations thereof that are included as part of and/or determined from the container data 102*d*2. The charging model 104*b*2 may then analyze this data to determine an appropriate charge value for the power supply 102*a*. The charge value may be and/or include a single numerical voltage value (e.g., 1 V, 2 V, etc.), a power supply capacity percentage (e.g., 95%, 50%, 25%, etc.) indicative of an amount of charge provided to the power supply 102*a* relative to the total capacity of the power supply 102*a***, and/or any other suitable value or indication.

For example, the shipping container 102 may arrive at a port as part of a large shipment including dozens/hundreds of containers, and shipping personnel may scan and/or otherwise identify each container that is included as part of the shipment. In this example, the container data **102*d*2 of the shipping container 102 may indicate that the autonomous transportation system 102*e* draws power from the power supply 102*a*, the container 102** has a remaining delivery distance of 125 miles from the port to the delivery destination, and that the optimal route from the port to the delivery destination includes 1 charging station approximately at a midpoint of the optimal route.

Continuing this example, the central server 104 may receive the container data **102*d*2 associated with the container 102 and respective container data associated with each other container that is part of the shipment. The central server 104 may then apply the charging model 104*b*2 to the set of container data that corresponds to the shipment, and the model 104*b*2 may determine charge values for each shipping container included in the shipment that requires charging. Accordingly, the charging model 104*b*2 may determine a charge value of 90% of the total charge capacity of the power supply 102*a* of the shipping container 102 because the container data 102*d*2 indicates that the power supply 102*a* may require a substantial amount of power to ensure the container 102 reaches the 1 charging station and/or the delivery destination without completely draining the power supply 102*a***.

The charging rate may generally indicate how quickly a power supply (e.g., power supply **102*a*) of a respective shipping container (e.g., shipping container 102) should receive charge from a charging station. The charging model 104*b*2 may determine the charging rate based upon the container data (e.g., container data 102*d*2). More specifically, the charging model 104*b*2 may analyze the container data 102*d*2 to determine components of the container 102 requiring power (e.g., autonomous transportation system 102*e*, additional systems 102*f*), a weight of the container 102 and the contents stored therein, remaining travel distance/time of the container 102, charging stations and/or otherwise charging options available along the remaining route of the container 102, a delivery date of the shipping container 102, and/or any other suitable data/information or combinations thereof that are included as part of and/or determined from the container data 102*d*2. The charging model 104*b*2 may then analyze this data to determine an appropriate charging rate for the power supply 102*a*. The charging rate may be and/or include a single numerical kilowatt value (e.g., 6 kW, 20 kW, etc.), a charging station charging rate percentage (e.g., 95%, 50%, 25%, etc.) indicative of a charging rate provided to the power supply 102*a*** relative to the maximum charging rate of the charging station, and/or any other suitable value or indication.

For example, the shipping container 102 may arrive at a port as part of a large shipment including dozens/hundreds of containers, and shipping personnel may scan and/or otherwise identify each container that is included as part of the shipment. In this example, the container data **102*d*2 of the shipping container 102 may indicate that the autonomous transportation system 102*e* draws power from the power supply 102*a*, the container 102 is nearly full and weighs 25 tons, the container 102 has a remaining delivery distance of 100 miles from the port to the delivery destination, and that container 102** has a delivery date one day from the current date.

Continuing this example, the central server 104 may receive the container data 102*d*2 associated with the container 102 and respective container data associated with each other container that is part of the shipment. The central server 104 may then apply the charging model 104*b*2 to the set of container data that corresponds to the shipment, and the model 104*b*2 may determine charging rates for each shipping container included in the shipment that requires charging. Accordingly, the charging model 104*b*2 may determine a charging rate of 95% of the maximum charging rate of the charging station because the container data 102*d*2 indicates that the power supply 102*a* requires a substantial amount of power in a short period of time to ensure the container 102 reaches the delivery destination by the delivery date.

The optimal route may generally correspond to a transportation route that a transportation vehicle (e.g., transportation vehicle 108) may take to transport the shipping container 102 to a delivery destination in a manner that most optimally ensures delivery of the container 102 to the delivery destination without exhausting the power supply 102*a* based upon one or more factors. These factors may include, for example, charge consumption of the power supply 102*a*, power generation source(s)/methods (e.g., solar, wind, coal, natural gas, etc.) of intervening charging stations from which the power supply 102 may receive power during transit, charging rates for such intervening charging stations each region, charging costs at such intervening charging stations, travel time/distance, forecast/current traffic or weather, and/or any other suitable constraints or combinations thereof.

In order to determine the optimal route, the central server 104 may access, retrieve, and/or receive location data corresponding to the shipping container 102.

The transportation configuration may generally correspond to a method of transportation and/or an arrangement of the shipping container 102 on the method of transportation that most optimally ensures delivery of the container 102 to the delivery destination without exhausting the power supply 102*a* based upon one or more factors. These factors may include, for example, charge consumption of the power supply 102*a*, power generation source(s)/methods of power sources on transportation vehicles (e.g., power source 108*c*), travel time/distance, forecast/current traffic or weather, and/or any other suitable constraints or combinations thereof.

Returning to FIG. 1, the charging module 104*b*1 may generally train the charging model 104*b*2 to output the charging prioritization, the charge value, and/or the charging rate using a training dataset. In particular, the training dataset may include a plurality of training container data, a plurality of training charging prioritizations, a plurality of training charge values, a plurality of training charging rates, and/or any other suitable data and combinations thereof. In some aspects, the training dataset may also include training transportation vehicle data, training regional charging data, training travel data, and/or other suitable data or combinations thereof. In certain aspects, the charging model 104*b*2 may be a rules-based algorithm configured to receive the container data as input and to output the charging prioritization, charge value, and/or the charging rate.

However, in some aspects, the charging module 104*b*1 may utilize one or more machine learning (ML) techniques to train the charging model 104*b*2 as a ML model. The charging model 104*b*2 may be trained using the training dataset that includes a plurality of training container data, a plurality of training charging prioritizations, a plurality of training charge values, a plurality of training charging rates, training transportation vehicle data, training regional charging data, training travel data, and/or any other suitable data and combinations thereof. The charging model 104*b*2 may use the training dataset to output, for each shipping container for which the model 104*b*2 receives container data as input, a charging prioritization, a charge value, and/or a charging rate.

Generally speaking, ML (Machine Learning) techniques have been developed that allow parametric or nonparametric statistical analysis of large quantities of data. Such ML techniques may be used to automatically identify relevant variables (i.e., variables having statistical significance or a sufficient degree of explanatory power) from data sets. This may include identifying relevant variables or estimating the effect of such variables that indicate actual observations in the data set. This may also include identifying latent variables not directly observed in the data, viz. variables inferred from the observed data points. More specifically, a processor or a processing element may be trained using supervised or unsupervised ML.

In supervised machine learning, a machine learning program operating on a server, computing device, or otherwise processors, may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on a server, computing device, or otherwise processors as described herein, to predict or classify, based upon the discovered rules, relationships, or model, an expected output, score, or value.

In unsupervised machine learning, the server, computing device, or otherwise processors, may be required to find its own structure in unlabeled example inputs, where, for example multiple training iterations are executed by the server, computing device, or otherwise processors to train multiple generations of models until a satisfactory model, e.g., a model that provides sufficient prediction accuracy when given test level or production level data or inputs, is generated.

Exemplary ML programs/algorithms that may be utilized by the charging module 104*b*1 to train the charging model 104*b*2 and/or by the charging model 104*b*2 include, without limitation: neural networks (NN) (e.g., convolutional neural networks (CNN), deep learning neural networks (DNN), combined learning module or program), linear regression, logistic regression, decision trees, support vector machines (SVM), naïve Bayes algorithms, k-nearest neighbor (KNN) algorithms, random forest algorithms, gradient boosting algorithms, Bayesian program learning (BPL), voice recognition and synthesis algorithms, image or object recognition, optical character recognition (OCR), natural language understanding (NLU), and/or other ML programs/algorithms either individually or in combination.

After training, ML programs (or information generated by such ML programs) may be used to evaluate additional data. Such data may be and/or may be related to container data of shipping containers (e.g., shipping container 102) that was not included in the training dataset. The trained ML programs (or programs utilizing models, parameters, or other data produced through the training process) may accordingly be used for determining, assessing, analyzing, predicting, estimating, evaluating, or otherwise processing new data not included in the training dataset. Such trained ML programs may, therefore, be used to perform part or all of the analytical functions of the methods described elsewhere herein.

It is to be understood that supervised ML and/or unsupervised ML may also comprise retraining, relearning, or otherwise updating models with new, or different, information, which may include information received, ingested, generated, or otherwise used over time. The disclosures herein may use one or more of such supervised and/or unsupervised ML techniques. Further, it should be appreciated that, as previously mentioned, the charging model **104*b*2 may be used to output charging prioritizations, charge values, and/or charging rates, using artificial intelligence (e.g., a ML model of the charging model 104*b*2**) or, in alternative aspects, without using artificial intelligence.

Moreover, although the methods described elsewhere herein may not directly mention ML techniques, such methods may be read to include such ML for any determination or processing of data that may be accomplished using such techniques. In some aspects, such ML techniques may be implemented automatically upon occurrence of certain events or upon certain conditions being met. In any event, use of ML techniques, as described herein, may begin with training a ML program, or such techniques may begin with a previously trained ML program.

When the charging model **104*b*2 determines the charging prioritization, the charge values, and/or the charging rates for each shipping container, the central server 104 may cause the shipping containers to receive charging at a charging station. More specifically, the central server 104 may cause each of the shipping containers to receive the respective charge value at the respective charging rate in a sequential order based upon the charging prioritization for each of the shipping containers. In certain aspects, the central server 104 may communicate with automated transportation equipment (not shown) that is configured to transport, maneuver, and/or otherwise position the shipping containers into charging stations (not shown). In these aspects, the central server 104** may also communicate with the charging stations in order to automatically charge the shipping container power supplies to the respective charge value at the respective charging rate in the sequential order based upon the charging prioritization for each of the shipping containers.

In other aspects, the central server 104 may transmit the charging prioritization, the charge values, and/or the charging rates to a user computing device 106 that is operated by shipping personnel. The shipping personnel may then view the user computing device 106 to determine how and when to charge each of the shipping containers indicated in the data transmitted by the central server 104. For example, the central server 104 may transmit indications to the user computing device 106 that a first shipping container is to be charged first at a first charging rate up to a first charge value, and that a second shipping container is to be charged second at a second charging rate up to a second charge value. The shipping personnel may view these indications on the user computing device 106, and may proceed to maneuver the first shipping container into a charging station for charging the respective power supply at the first charging rate up to the first charge value. Thereafter, the shipping personnel may remove the first shipping container from the charging station, and may proceed to maneuver the second shipping container into the charging station for charging the respective power supply at the second charging rate up to the second charge value.

The user computing device 106 may be associated with (e.g., in the possession of, configured to provide secure access to, etc.) a particular user, who may be shipping personnel that are present in a port or other location where shipping container (e.g., shipping container 102) power supplies (e.g., power supply **102*a*) are charged prior to further transportation. Additionally, or alternatively, the user computing device 106 may be operated by a transportation vehicle (e.g., transportation vehicle 108) operator who is tasked with transporting shipping containers to a delivery destination, and who must ensure that the power supplies of the shipping containers have sufficient charge to provide power to the necessary components until the containers reach the delivery destination. The user computing device 106 may be a personal computing device of that user, such as a smartphone, a tablet, smart glasses, or any other suitable device or combination of devices (e.g., a smart watch plus a smartphone) with wireless communication capability. In the embodiment of FIG. 1, the user computing device 106 may include a processor 106*a*, a memory 106*b*, a networking interface 106*c*, and a display 106*d***.

The user computing device 106 may be communicatively coupled to the shipping container 102, the central server 104, the transportation vehicle 108, and/or the servers 110, 112, 114. For example, the user computing device 106 and the shipping container 102, the central server 104, the transportation vehicle 108, and/or the servers 110, 112, 114 may communicate via USB, Bluetooth, Wi-Fi Direct, Near Field Communication (NFC), etc. For example, the central server 104 may transmit charging prioritizations, charge values, and/or charging rates to the user computing device 106 via the networking interface **104*c*, which the device 106 may receive via the networking interface 106*c***.

Further, the user computing device 106 may obtain container data from a remote location (e.g., external server 114) upon logging the arrival of the shipping container 102. For example, a user may take a photograph of the shipping container 102 or input identifying information corresponding to the container 102 into the user computing device 106, and the user computing device 106 may access the external server 114 to retrieve the container data **114*c*1 corresponding to the shipping container 102. The user computing device 106 may then generate a communication that includes the container data 114*c*1, and may transmit the communication to the central server 104 via the networking interface 106*c***.

The transportation vehicle 108 may be any vehicle suitable to transport a shipping container 102, such as a truck, train, plane, boat, and/or any other vehicle. The transportation vehicle 108 may include a processor **108*a*, a networking interface 108*b*, a power source 108*c*, and a memory 108*d*. For example, each of the processor 108*a*, the networking interface 108*b*, and the memory 108*d* may be included as part of an internal computing device that is installed and/or otherwise disposed on the transportation vehicle 108. The power source 108*c* may be any power source configured to provide power to shipping containers (e.g., shipping container 102) and/or any other components transported and/or otherwise disposed on the transportation vehicle 108**.

The memory **108*d* may include transportation vehicle data 108*d*1, which may include information about the transportation vehicle 108. In particular, the transportation vehicle data 108*d*1 may include information/data indicating how the power source 108*c* on-board the transportation vehicle 108 generates power for charging additional components. For example, the power source 108***c* may be or include power generation techniques including: regenerative braking, solar power via solar panels affixed to the vehicle 108 or transported components (e.g., shipping container 102), dedicated batteries stored in/on the vehicle 108, gasoline, and/or any other suitable power generation techniques or combinations thereof.

The external servers 110, 112, 114 may be computing servers and/or combinations of multiple servers storing data that may be accessed/retrieved by the shipping container 102, the central server 104, the user computing device 106, and/or the transportation vehicle 108. The data stored by the external servers 110, 112, 114 may include regional charging data 110*c*1, travel data 112*c*1, and container data 114*c*1. Generally speaking, each of the regional charging data 110*c*1, the travel data 112*c*1, and the container data 114*c*1 may be accessed, retrieved, and/or otherwise received by the central server 104, and may be utilized by the charging model 104*b*2 to determine charging prioritizations, charge values, and/or charging rates.

The regional charging data 110*c*1 may include data corresponding to available charging stations and charging station data in particular regions in which the shipping container 102 may be transported in order to reach the delivery destination. Each region described and/or otherwise indicated in the regional charging data 110*c*1 may be a country, a state, a province, a county, a parish, a city, a town, etc., and/or a sub-region therein or any suitable area. In particular, the regional charging data 110*c*1 may include, without limitation, a power generation method indication for each region, a charging rate for each region, and a charging cost for each region. Using this regional charging data 110*c*1, the charging model 104*b*2 may determine such outputs as a charging prioritization, a charge value, a charging rate, an optimal route, and/or a transportation configuration.

Each of the indications/values included as part of the regional charging data 110*c*1 includes different data for the charging model 104*b*2 to analyze. The power generation method indication may indicate, for example, whether or not the power available to charge the shipping container 102 power supply 102*a* in the corresponding region is generated through renewable energy sources (e.g., solar, wind, nuclear, etc.) or through non-renewable energy sources (e.g., coal, natural gas, etc.). The charging rate for each region may indicate how quickly/slowly (e.g., 3 kW, 50 kW, etc.) the charging stations available in the corresponding region are able to supply power to the power supply 102*a* in order to charge the power supply 102*a*. The charging cost for each region may indicate a cost per unit of energy consumed (e.g., $0.20 per kWh) while charging the power supply 102*a*.

The travel data 112*c*1 may include data corresponding to routes that a transportation vehicle (e.g., transportation vehicle 108) may take when transporting the shipping container 102 to a delivery destination. For example, the travel data 112*c*1 may include forecasted/real-time weather data and/or traffic data along a potential/accepted route(s) for the shipping container 102, routing data that enables the charging model 104*b*2 to determine an optimal route for the shipping container 102, and/or any other suitable data or combinations thereof. Using this travel data 112*c*1, the charging model 104*b*2 may determine outputs such as a charging prioritization, a charge value, a charging rate, an optimal route, and/or a transportation configuration.

The container data 114*c*1 may be stored on the external server 114 as a backup storage method in the event that the container data 102*d*2 is not stored in the memory 102*d* of the shipping container 102. For example, the shipping container 102 may not include the memory 102*d*, and as a result, may be unable to store the container data 102*d*2 locally. Therefore, when shipping personnel scan the shipping container 102 upon its arrival and/or the container 102 is otherwise registered as having arrived at a port, for example, the user computing device 106 and/or the central server 104 may access/retrieve the container data 114*c*1 corresponding to the shipping container 102 from the external server 114. When the central server 104 receives the container data 114*c*1 corresponding to the shipping container 102, then the server 104 may proceed to apply the charging model 104*b*2 to the data 114*c*1 to output a charging prioritization, a charge value, a charging rate, an optimal route, and/or a transportation configuration associated with the container 102.

Each of the processors 102*c*, 104*a*, 106*a*, 108*a*, 110*a*, 112*a*, 114*a* may include any suitable number of processors and/or processor types. For example, the processors 102*c*, 104*a*, 106*a*, 108*a*, 110*a*, 112*a*, 114*a* may include one or more CPUs and one or more graphics processing units (GPUs). Generally, each of the processors 102*c*, 104*a*, 106*a*, 108*a*, 110*a*, 112*a*, 114*a* may be configured to execute software instructions stored in each of the corresponding memories 102*d*, 104*b*, 106*b*, 108*d*, 110*c*, 112*c*, 114*c*. The memories 102*d*, 104*b*, 106*b*, 108*d*, 110*c*, 112*c*, 114*c* may include one or more persistent memories (e.g., a hard drive and/or solid state memory) and may store one or more applications and/or modules, such as the charging module 104*b*1.

Each of the shipping container 102, the central server 104, the user computing device 106, the transportation vehicle 108, and the external servers 110, 112, 114 may be communicatively coupled together via the network 130 and the respective networking interfaces 102*b*, 104*c*, 106*c*, 108*b*, 110*b*, 112*b*, 114*b*. The network 130 may be a single communication network, or may include multiple communication networks of one or more types (e.g., one or more wired and/or wireless local area networks (LANs), and/or one or more wired and/or wireless wide area networks (WANs), such as the internet).

It will be understood that the above disclosure is one example and does not necessarily describe every possible embodiment. As such, it will be further understood that alternate embodiments may include fewer, alternate, and/or additional steps or elements.

Figure 2:
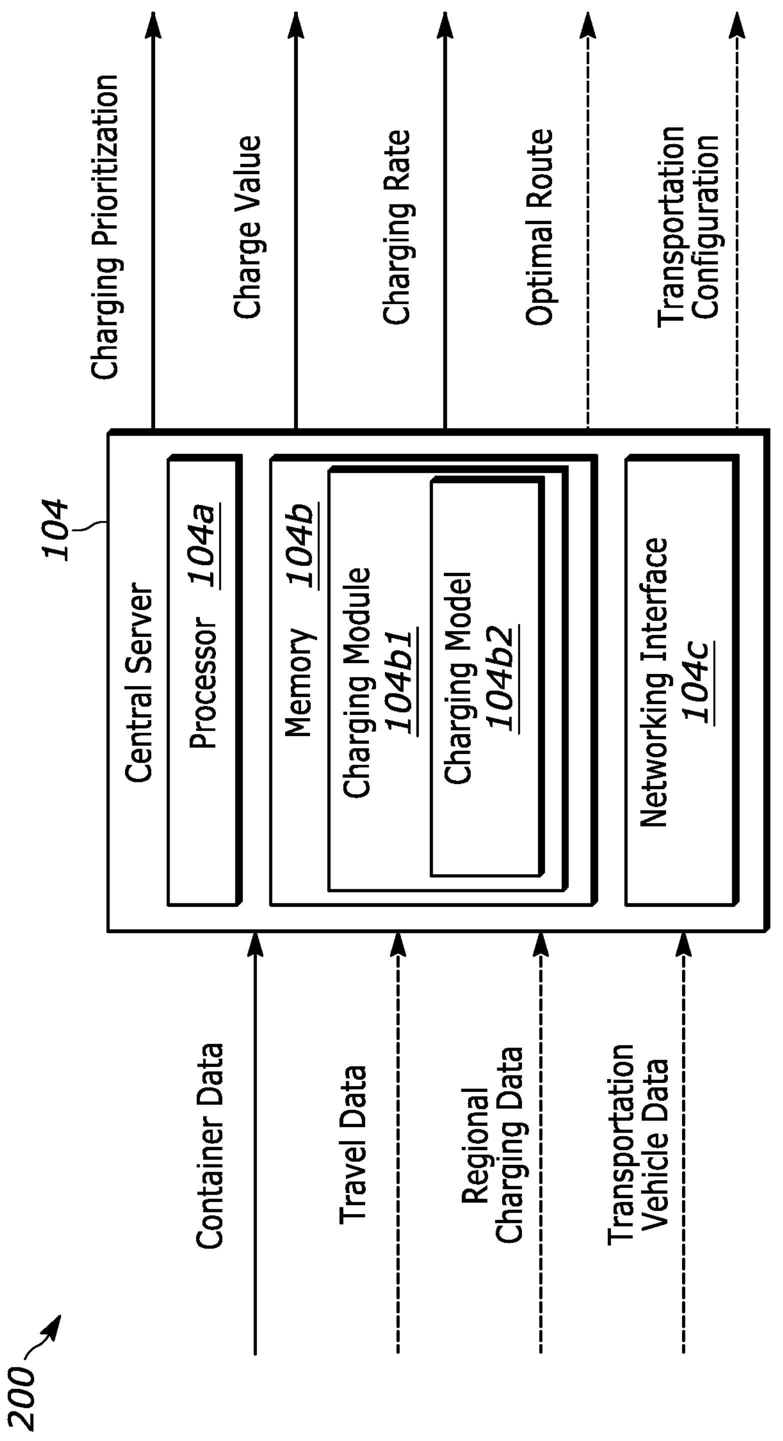
FIG. 2 depicts an exemplary workflow for a computing device of FIG. 1, in accordance with various embodiments described herein.

Exemplary Workflow for a Computing Device to Intelligently Charge Shipping Container Power Supplies FIG. 2, depicts an exemplary workflow 200 for a computing device (e.g., the central server 104) of FIG. 1, in accordance with various embodiments described herein. The exemplary workflow 200 generally illustrates various data received/retrieved by the central server 104 that is utilized by the charging model 104*b*2 as inputs to generate various outputs. The various data received/retrieved by the central server 104 includes container data, travel data, regional charging data, and/or transportation vehicle data. The various outputs generated by the charging model 104*b*2 based upon the received/retrieved data includes a charging prioritization, a charge value, a charging rate, an optimal route, and/or a transportation configuration.

As previously described, the container data, the travel data, the regional charging data, and/or the transportation vehicle data received/retrieved by the central server 104 may include a large variety of specific information/data. For example, the container data may include data indicative of whether or not the shipping container (e.g., shipping container 102) includes a power supply (e.g., power supply 102*a*), the current charge of the power supply 102*a*, the current weight of the container 102, the destination of the shipping container 102, and/or any other suitable information or combinations thereof. The travel data may include forecasted/real-time weather data and/or traffic data along a potential/accepted route(s) for a shipping container, routing data that enables the charging model 104*b*2 to determine an optimal route for the shipping container, and/or any other suitable data or combinations thereof. The regional charging data may include data corresponding to available charging stations and charging station data in particular regions in which the shipping container 102 may be transported in order to reach the delivery destination. The transportation vehicle data may include data indicating how a power source on-board a transportation vehicle (e.g., transportation vehicle 108) generates power for charging additional components.

Using this data as input, the charging model 104*b*2 may determine one or more of the outputs, such as a charging prioritization, a charge value, a charging rate, an optimal route, and/or a transportation configuration. Of course, in certain instances, the charging model 104*b*2 may not receive any travel data, any regional charging data, and/or any transportation vehicle data for a particular shipping container. In these instances, the charging model 104*b*2 may receive only the container data for the particular shipping container, and may generate at least the charging prioritization, the charge value, and the charging rate for the particular shipping container. The charging model 104*b*2 may additionally be configured to generate an optimal route and/or a transportation configuration for the shipping container if the model 104*b*2 only receives the container data as input. However, in some aspects, the charging model 104*b*2 may require one or more of the travel data, the regional charging data, and/or the transportation vehicle data to generate one or more of the optimal route and/or the transportation configuration for a shipping container.

As an example, the charging model 104*b*2 may receive container data corresponding to a respective shipping container (e.g., shipping container 102), and the model 104*b*2 may proceed to analyze the container data in order to generate corresponding outputs. The container data may indicate that the shipping container includes a power supply (e.g., power supply 102*a*), an autonomous transportation system (e.g., autonomous transportation system 102*e*), the container is half full and weighs approximately 12 tons, and that the shipping container may need to autonomously travel 50 miles from its current location to its ending/delivery destination within one week of the current date to avoid a late delivery. The charging model 104*b*2 may determine that charging the shipping container power supply to 40% of the total charge capacity of the power supply at a 10 kW charging rate is sufficient for the respective container to complete the mile journey based upon the 12 ton weight of the container. The charging model 104*b*2 may further determine that a 5-10% charge buffer should be added to the 40% charge value in order to ensure that the power supply can continuously supply power to the autonomous transportation system of the shipping container until the container reaches the delivery destination without fully discharging the power supply.

Continuing the above example, several other shipping containers may have delivery dates that significantly or technically pre-date the one week delivery date of the shipping container. Accordingly, the charging model 104*b*2 may further determine that the shipping container should have a relatively low charging prioritization due to the one week delivery date. The charging model 104*b*2 may then cause the respective shipping container power supply to receive 45-50% of the total charge capacity of the power supply at 10 kW after every other shipping container power supply with a higher relative charging prioritization. Therefore, this shipping container power supply (and every other shipping container power supply) receives precisely as much charge as necessary to complete the 50 mile journey without delay, without expending all available power of the power supply, and thereby avoiding damage to the power supply.

In another example, the charging model 104*b*2 may receive container data and travel data corresponding to a respective shipping container (e.g., shipping container 102), and the model 104*b*2 may proceed to analyze the container data and travel data in order to generate corresponding outputs. The container data may indicate that the shipping container includes a power supply (e.g., power supply 102*a*), an autonomous transportation system (e.g., autonomous transportation system 102*e*), the container is full and weighs approximately 25 tons, and that the shipping container may need to autonomously travel 150 miles from its current location to its ending/delivery destination within four days of the current date to avoid a late delivery. The travel data may indicate that traffic along the route planned for the shipping container is typically (i.e., forecasted to be) very heavy during times when the container is likely to travel to the delivery destination.

The charging model 104*b*2 may accordingly determine that charging the shipping container power supply to 80% of the total charge capacity of the power supply at a 20 kW charging rate is sufficient for the respective container to complete the 150 mile journey based upon the 25 ton weight of the container. The charging model 104*b*2 may also determine that the 80% charge value, with a 5-10% charge buffer, should be sufficient to ensure that the power supply can continuously supply power to the autonomous transportation system of the shipping container until the container reaches the delivery destination without fully discharging the power supply.

In particular, the charging model 104*b*2 may analyze the travel data and determine that the heavy forecasted traffic along the route to the delivery destination may necessitate a higher than normal charge value for the 150 mile journey because the shipping container may be unable to efficiently/quickly travel the 150 miles. Accordingly, the charging model 104*b*2 may cause the shipping container power supply to receive 85-90% of the total charge capacity of the power supply at 20 kW. Therefore, this shipping container power supply receives precisely as much charge as necessary to complete the 150 mile journey even in the event that the shipping container experiences heavy traffic along the route to the delivery destination. Additionally, or alternatively, the charging model 104*b*2 may analyze the travel data in view of the container data, and the model 104*b*2 may output an optimal route that circumvents and/or otherwise alleviates the heavy forecasted traffic concerns of the current route to the delivery destination. Of course, it should be understood that the charging model 104*b*2 may also output a charging prioritization in this (and every other) example.

In yet another example, the charging model 104*b*2 may receive container data and regional charging data corresponding to a respective shipping container (e.g., shipping container 102), and the model 104*b*2 may proceed to analyze the container data and regional charging data in order to generate corresponding outputs. The container data may indicate that the shipping container includes a power supply (e.g., power supply 102*a*), an autonomous transportation system (e.g., autonomous transportation system 102*e*), the container weighs approximately 10 tons, that the shipping container may need to autonomously travel approximately 180, 200, or 220 miles from its current location to its ending/delivery destination along three different respective transportation routes, and that the shipping container must arrive at the delivery destination within two weeks of the current date to avoid a late delivery. The regional charging data may indicate that there are two 20 kW charging stations along the first transportation route (180 miles) that receive power from a coal power plant in a first region at $0.25 per kWh, one 7 kW charging station midway along the second transportation route (200 miles) that receives power from a wind farm in a second region at $0.15 per kWh, and no charging stations along the third transportation route (220 miles).

Continuing the above example, the charging model 104*b*2 may determine that charging the shipping container power supply to 85% (with a 5% to 10% buffer) of the total charge capacity of the power supply at a 7 kW charging rate with a relatively low charging prioritization is sufficient for the respective container to complete the journey based upon the 10 ton weight of the container and the two week delivery date. The charging model 104*b*2 may also determine that the second transportation route (200 miles) is the optimal route of the three transportation routes included in the container data.

In particular, the charging model 104*b*2 may determine that the relatively longer distance (200 miles) than the first route (180 miles) is not problematic due to the two week delivery date, and that the 7 kW charging station along the second route is preferable to the two kW charging stations of the first route and the no charging stations of the third route. The charging model 104*b*2 may determine that the 7 kW charging station may provide a sufficient amount of charge to the power supply at a sufficient charging rate to enable the shipping container to reach the delivery destination by the two week delivery date while incurring a lower cost of power ($0.15 per kWh) than is available along the first route ($0.25 per kWh). Moreover, the charging model 104*b*2 may prioritize renewable energy sources, such that the 7 kW charging station along the second route receiving power from the wind farm in the second region may receive a higher weighting and/or other parameterization than the two 20 kW charging stations receiving power from the coal power plant in the first region.

In still another example, the charging model 104*b*2 may receive container data and transportation vehicle data corresponding to a respective shipping container (e.g., shipping container 102), and the model 104*b*2 may proceed to analyze the container data and transportation vehicle data in order to generate corresponding outputs. The container data may indicate that the shipping container includes a power supply (e.g., power supply 102*a*) used to power a refrigeration unit, the container is full and weighs approximately 30 tons, and that the shipping container may need to travel 300 miles from its current location to its ending/delivery destination within one week of the current date to avoid a late delivery. The transportation vehicle data may indicate that the transportation vehicle (e.g., transportation vehicle 108) configured to transport the shipping container may be a train with a regenerative braking system and that may enable solar panels to be installed on the shipping container for use during transit that can collectively provide power to the shipping container power supply at 3 kW, as necessary, during transit.

The charging model 104*b*2 may accordingly determine that charging the shipping container power supply to 40% of the total charge capacity of the power supply at a 7 kW charging rate is sufficient for the respective container to complete the 300 mile journey based upon the 30 ton weight of the container and that the transportation vehicle is configured to provide an on-board power supply. In particular, the charging model 104*b*2 may analyze the transportation vehicle data and determine that the shipping container power supply does not require a substantial charge at the current location because the shipping container power supply may receive charging at 3 kW from the train's regenerative braking system and solar panels installed on the shipping container during transit to the delivery destination.

Figure 3:
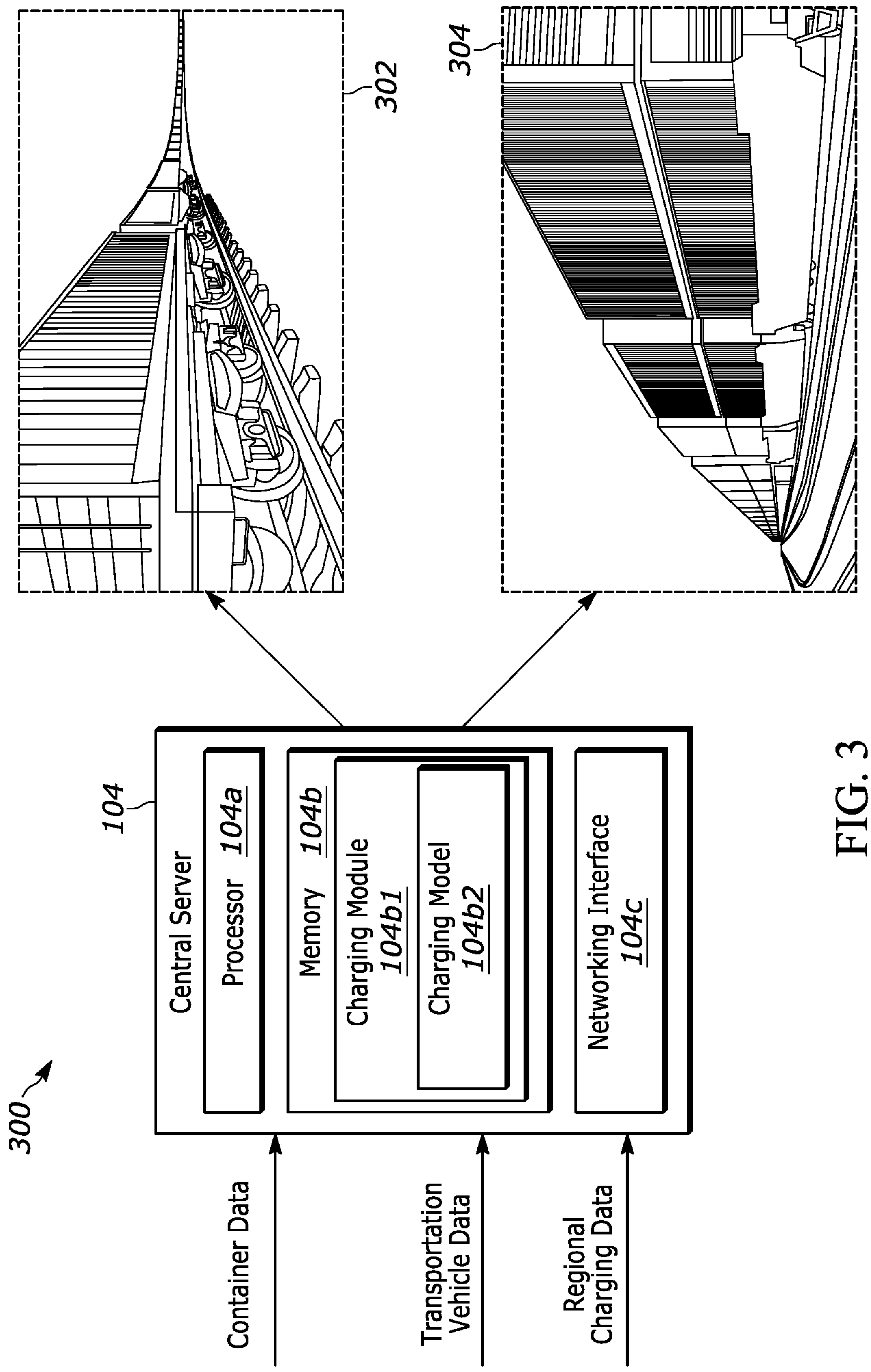
FIG. 3 depicts an exemplary computing device determining transportation configurations for transporting shipping containers with power supplies, in accordance with various embodiments described herein.

Exemplary Computing Device Determinations to Intelligently Charge Shipping Container Power Supplies FIG. 3 depicts a computing device (e.g., central server 104) determining transportation configurations for transporting shipping containers with power supplies, in accordance with various embodiments described herein. In particular, FIG. 3 depicts an exemplary transportation configuration determination 300 performed by the central server 104 based upon container data, transportation vehicle data, and regional charging data received by the central server 104.

The central server 104 may receive the transportation vehicle data, and may determine that the transportation vehicle includes an integrated/alternative power source (e.g., power source 108*c*). For example, the transportation vehicle may be a train, and the train may include a regenerative braking system capable of providing power to charge power supplies of the shipping containers being transported thereon. Further in this example, and as depicted in the example transportation configurations 302, 304, the train may carry the shipping containers in a manner that exposes the shipping containers to the external environment. As a result, the shipping containers may have solar panels removably affixed to the tops of the shipping containers and connected directly/indirectly to their respective power supplies for charging. In this manner, the transportation vehicle (e.g., the train) may include and/or facilitate various integrated/alternative power sources that shipping container power supplies may utilize for charging during transportation to the delivery destination.

The central server 104 may also receive the regional charging data, and may determine that the routes indicated in the container data and/or otherwise determined by the charging model 104*b*2 may include various numbers of charging stations along the route that provide power at various rates that is generated by various different power generation methods (e.g., solar, wind, gas, nuclear, etc.). For example, a first route may have no charging stations, while a second route has three 20 kW charging stations along the route to the delivery destination. Further in this example, the charging model 104*b*2 may determine that none of the shipping containers to be transported by the transportation vehicle (e.g., transportation vehicle 108) may require charging during transit.

As a result, in the prior example, the charging model 104*b*2 may determine that the first route is an optimal route for the transportation vehicle to travel, and that the transportation configuration illustrated by the second example transportation configuration 304 is optimal for this shipment of shipping containers. The second example transportation configuration 304 features shipping containers stacked on top of one another in well cars. By contrast, the first example transportation configuration 302 features shipping containers on flatcars that are not stacked on top of one another. The second example transportation configuration 304 may enable the transportation vehicle to transport more shipping containers with fewer cars, but may disable each shipping container from having, for example, a solar panel installed on top to provide charging to the respective power supply during transit. However, the charging model **104*b*2 determined that such in-transit charging is unnecessary for this shipment of shipping containers, so the second example transportation configuration 304** may optimize the transportation efficiency of the shipping containers by reducing the total load (e.g., number of cars) on the transportation vehicle, and thereby minimizing the fuel expended during transportation.

Figure 4:
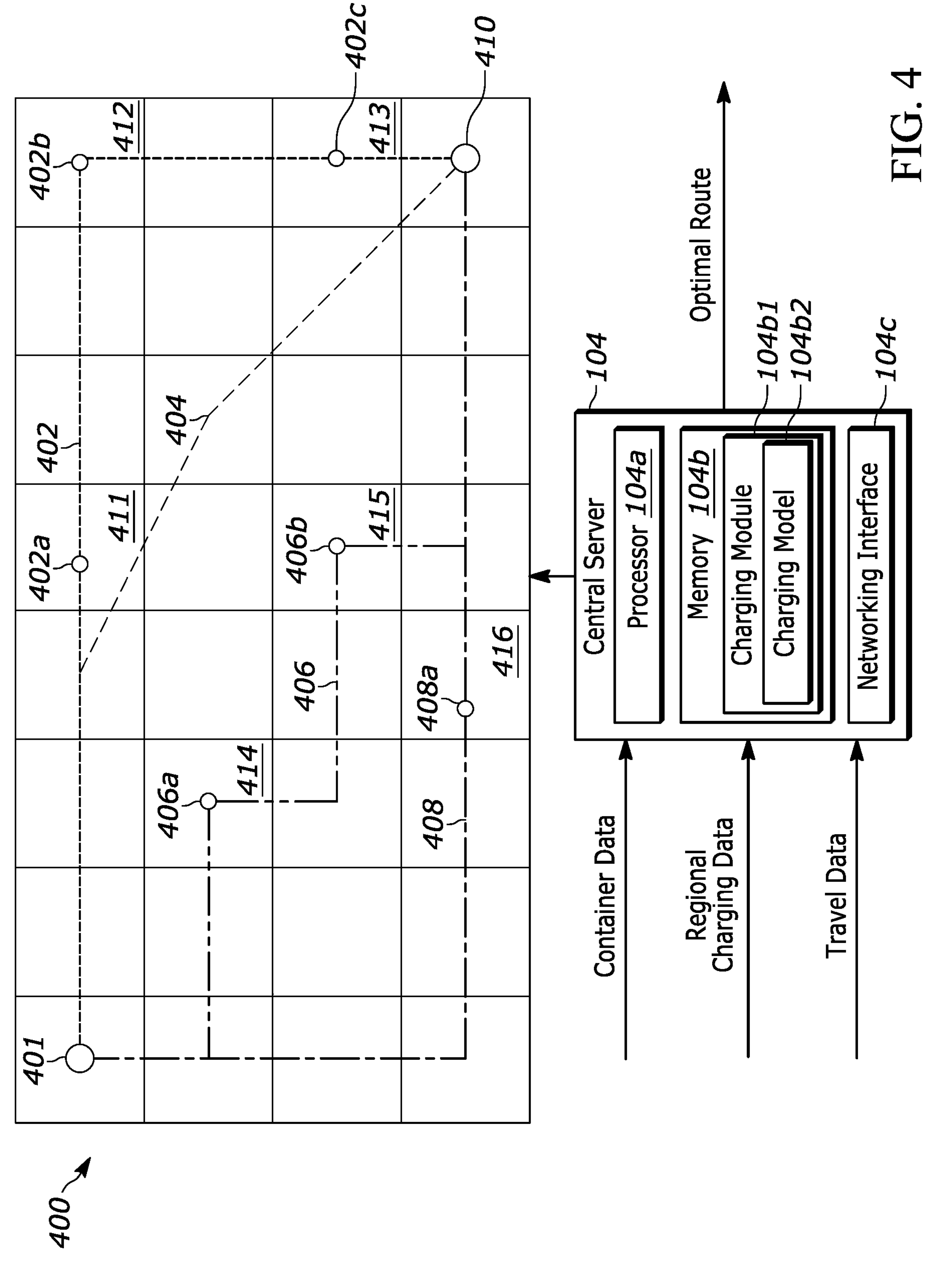
FIG. 4 depicts an exemplary computing device determining optimal routes for transporting shipping containers with power supplies, in accordance with various embodiments described herein.

FIG. 4 depicts a computing device (e.g., central server 104) determining optimal routes for transporting shipping containers with power supplies, in accordance with various embodiments described herein. In particular, FIG. 4 depicts an exemplary optimal route determination 400 from a starting point 401 to a destination 410 performed by the central server 104 based upon container data, regional charging data, and travel data received by the central server 104.

The central server 104 may receive the container data, and the container data may include one or more transportation routes 402, 404, 406, 408 that a transportation vehicle may take to deliver a shipping container to the destination 410. In certain aspects, the container data may include address data and/or other geolocation data indicating the destination 410 and/or the starting point 401 that the central server 104 may send to a mapping application and/or other similar service to generate each of the transportation routes 402, 404, 406, 408. Regardless, the central server 104 may receive each of the transportation routes 402, 404, 406, 408 along with relevant data corresponding to the routes 402, 404, 406, 408, such as total travel distance from the starting point 401 to the destination 410. In the exemplary optimal route determination 400 depicted in FIG. 4, the routes 402, 406, 408 may have equivalent total travel distances, while route 404 may have a shorter total travel distance than the other routes 402, 406, 408.

The travel data may generally indicate forecasted/real-time traffic conditions and/or weather conditions relating to each route 402-408. For example, the travel data may indicate that traffic along routes 402 is typically (i.e., forecasted to be) very heavy during times when the container is likely to travel to the destination 410, that traffic along routes 406, 408 is typically very light/minimal during times when the container is likely to travel to the destination 410, and that traffic along route 404 is typically an average amount for the corresponding roads comprising the route 404 during times when the container is likely to travel to the destination 410. Further, the travel data may indicate that the weather forecast for portions/all of routes 402, 404 includes heavy rainfall, and that the weather forecast for portions/all of routes 406, 408 includes clear skies.

The regional charging data may generally indicate charging station locations, numbers, charging rates, power generation methods, etc. for charging stations along and/or nearby each of routes 402-408. For example, the regional charging data may indicate that route 402 has three 20 kW charging stations **402*a-c* along and/or nearby the route 402 that receive power from a wind farm at $0.18 per kWh in each of regions 411, 412, 413, route 404 has no charging stations along and/or nearby the route 404, route 406 has two 10 kW charging stations 406*a*, 406*b* along and/or nearby the route 406 that receive power from a solar farm/array at $0.17 per kWh in each of regions 414, 415, and that route 408 has one 30 kW charging station 408*a* along and/or nearby the route 408 that receives power from a natural gas power plant at $0.22 per kWh in region 416**.

Using this container data, travel data, and regional charging data, the charging model **104*b*2 may determine an optimal route to transport the shipping container from the starting point 401 to the destination 410. In particular, the charging model 104*b*2 may analyze the received data and determine that if the shipping container to be transported may require charging during transit because the journey from the starting point 401 to the destination 410 is too long for the power supply of the shipping container to consistently supply power using a single, full charge, then route 404 may be eliminated as non-viable because there are no charging stations along and/or nearby the route 404**.

The charging model **104*b*2 may also determine that if the shipping container requires a route with minimal transportation time (e.g., an urgent delivery date), then route 402 may be eliminated as non-viable because the forecasted heavy traffic and rain create a transportation situation in which the shipping container has a reduced chance to arrive on time. Further, the charging model 104*b*2 may determine that if the shipping container requires a route with minimal charging cost and/or charging from renewable energy sources, then route 408 may be eliminated as non-viable because the charging cost at the charging station 408*a* ($0.22 per kWh) is higher than all other charging stations 402*a-c*, 406*a-b*, and the power utilized at the charging station 408*a*** is generated by a non-renewable energy source (natural gas power plant).

However, in the exemplary optimal route determination 400 depicted in FIG. 4, the charging model **104*b*2 may determine that none of the requirements of the shipping container result in the elimination of route 406. More specifically, the charging model 104*b*2 may determine that the route 406 provides an expedient path for delivery (e.g., light/minimal traffic) with multiple charging stations 406*a*, 406*b* receiving power from a renewable energy source (solar farm/array) at an relatively inexpensive price ($0.17 per kWh). Therefore, in the exemplary optimal route determination 400 depicted in FIG. 4, the charging model 104*b*2 may determine that route 406 is the optimal route along which to transport the shipping container from the starting point 401 to the destination 410**.

Of course, it should be understood that the exemplary optimal route determination 400 depicted in FIG. 4 is for the purposes of discussion only. The charging model **104*b*2** described herein may determine an optimal route based upon any suitable data/information included and/or indicated in any of the container data, the regional charging data, the travel data, the transportation vehicle data, and/or any other suitable data or combinations thereof.

Figure 5:
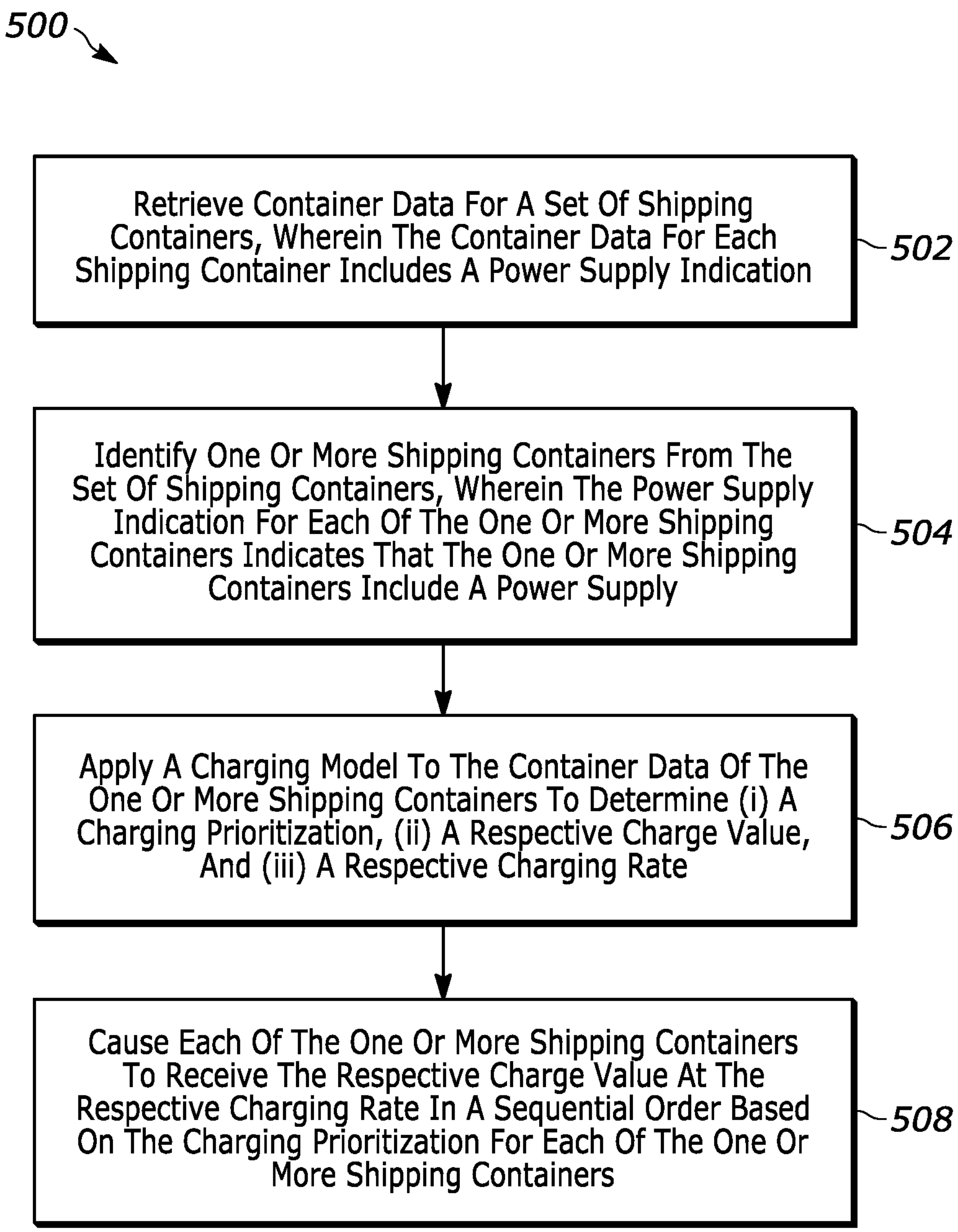
FIG. 5 depicts a flow diagram representing an exemplary computer-implemented method for intelligent charging of shipping container power supplies, in accordance with various embodiments described herein.

Exemplary Methods for Intelligently Charging Shipping Container Power Supplies FIG. 5 depicts a flow diagram representing an exemplary computer-implemented method 500 for intelligent charging of shipping container power supplies, in accordance with various embodiments described herein. The method 500 may be implemented by one or more processors of a computing system such as the central server 104, the user computing device 106, and/or an external server 110, 112, 114.

The method 500 includes retrieving, by one or more processors, container data for a set of shipping containers, wherein the container data for each shipping container includes a power supply indication (block 502). In certain aspects, the container data for each shipping container includes (i) the power supply indication, (ii) a container weight value, (iii) a remaining travel distance value, (iv) an additional charging requirement indication, and/or (v) a delivery deadline value. The container weight value may generally indicate a current weight of the shipping container. The remaining travel distance value may generally indicate a distance from an arrival location of the shipping container (e.g., starting point 401) to a delivery destination (e.g., destination 410). The additional charging requirement indication may generally indicate whether or not the shipping container will require additional charging of the power supply during transit because the remaining travel distance exceeds the maximum range of the power supply. The delivery deadline value may generally indicate a date when the shipping container is expected to arrive at the delivery destination.

The method 500 further includes identifying, by the one or more processors, one or more shipping containers from the set of shipping containers (block 504). Generally, the power supply indication for each of the one or more shipping containers may indicate that the one or more shipping containers include a power supply (e.g., power supply 102*a*).

The method 500 further includes applying, by the one or more processors, a charging model (e.g., charging model 104*b*2) to the container data of the one or more shipping containers to determine (i) a charging prioritization for each of the one or more shipping containers, (ii) a respective charge value for each of the one or more shipping containers, and/or (iii) a respective charging rate for each of the one or more shipping containers (block 506). In certain aspects, the method 500 may further include determining whether or not one of the one or more shipping containers includes an autonomous transportation module (e.g., autonomous transportation module 102*d*1). In these aspects, the one of the one or more shipping containers that includes an autonomous transportation module may have a higher charging prioritization than the one or more shipping containers that do not have the autonomous transportation module.

In some aspects, the charging model is a machine learning (ML) model configured to receive container data and output the charging prioritization, the respective charge value, and the respective charging rate. In these aspects, the method 500 may further include training, by the one or more processors, the ML model using (i) a plurality of training container data, (ii) a plurality of training charging prioritizations, (iii) a plurality of training charge values, and (iv) a plurality of training charging rates. Further in these aspects, the method 500 may include applying, by the one or more processors, the ML model to the container data in order to output (i) the charging prioritization for each of the one or more shipping containers, (ii) the respective charge value for each of the one or more shipping containers, and/or (iii) the respective charging rate for each of the one or more shipping containers.

In certain aspects, the method 500 may further include calculating, by the one or more processors executing the charging model, the respective charge value based upon a remaining travel distance value corresponding to a respective shipping container of the one or more shipping containers. In these aspects, at least one respective charge value may be less than a maximum capacity of a respective power supply. For example, the charging model 104*b*2 may determine a respective charge value to be 40% of the maximum capacity of the corresponding power supply because the power supply may only require 25-30% of the maximum capacity to continuously supply power to the necessary components on-board the shipping container while the shipping container is transported to the delivery destination.

In some aspects, the method 500 may further include retrieving, by the one or more processors, a set of travel data that includes (a) forecasted weather data, (b) real-time weather data, (c) forecasted traffic data, and/or (d) real-time traffic data. In these aspects, the method 500 may further include applying, by the one or more processors, the charging model to the container data of the one or more shipping containers and the set of travel data to determine (i) the charging prioritization for each of the one or more shipping containers, (ii) the respective charge value for each of the one or more shipping containers, and/or (iii) the respective charging rate for each of the one or more shipping containers.

In certain aspects, the method 500 may further include applying, by the one or more processors, the charging model to the container data of the one or more shipping containers to determine (i) the charging prioritization for each of the one or more shipping containers, (ii) the respective charge value for each of the one or more shipping containers, and/or (iii) the respective charging rate for each of the one or more shipping containers. In these aspects, the respective charge value may include a buffer charge value (e.g., 5-10% extra charge, or any suitable value) configured to enable each of the one or more shipping containers to reach a respective destination without fully draining a respective power supply.

In some aspects, the method 500 may further include retrieving, by the one or more processors, a set of regional charging data for one or more charging regions that includes (a) a power generation method indication for each region, (b) a charging rate for each region, and/or (c) a charging cost for each region. In these aspects, the method 500 may further include applying, by the one or more processors, the charging model to the container data of the one or more shipping containers and the set of regional charging data to determine (i) the charging prioritization for each of the one or more shipping containers, (ii) the respective charge value for each of the one or more shipping containers, (iii) the respective charging rate for each of the one or more shipping containers, and/or (iv) an optimal route for each of the one or more shipping containers.

In certain aspects, the method 500 may further include retrieving, by the one or more processors, a set of transportation vehicle data based upon one or more transportation vehicles designated to transport shipping containers of the one or more shipping containers. In these aspects, the method 500 may further include applying, by the one or more processors, the charging model to the container data of the one or more shipping containers and the set of transportation vehicle data to determine (i) the charging prioritization for each of the one or more shipping containers, (ii) the respective charge value for each of the one or more shipping containers, (iii) the respective charging rate for each of the one or more shipping containers, and/or (iv) a transportation configuration for each of the one or more shipping containers.

The method 500 further includes causing, by the one or more processors, each of the one or more shipping containers to receive the respective charge value at the respective charging rate in a sequential order based upon the charging prioritization for each of the one or more shipping containers (block 508). For example, the charging model may automatically instruct loading and/or other equipment to position and/or otherwise connect the shipping container to a charging station to supply power to the power supply in accordance with the respective charge value at the respective charging rate in the sequential order based upon the charging prioritization. Additionally, or alternatively, the central server may transmit a notification to a user computing device (e.g., user computing device 106), such that a user (e.g., shipping personnel) may position and/or otherwise connect the shipping container to a charging station to supply power to the power supply in accordance with the respective charge value at the respective charging rate in the sequential order based upon the charging prioritization.

It will be understood that the above disclosure is one example and does not necessarily describe every possible embodiment. As such, it will be further understood that alternate embodiments may include fewer, alternate, and/or additional actions or elements.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The systems and methods described herein are directed to an improvement to computer functionality, and improve the functioning of conventional computers. Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules include a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for evaluation properties, through the principles disclosed herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A computer-implemented method for intelligent charging of shipping container power supplies, the computer-implemented method comprising:

retrieving, by one or more processors, container data for a set of shipping containers, wherein the container data for each shipping container includes a power supply indication;

identifying, by the one or more processors, one or more shipping containers from the set of shipping containers, wherein the power supply indication for each of the one or more shipping containers indicates that the one or more shipping containers include a power supply;

determining, by the one or more processors, whether one of the one or more shipping containers includes a set of autonomous transportation instructions, and wherein the one of the one or more shipping containers that includes the set of autonomous transportation instructions receives a higher charging prioritization than the one or more shipping containers that do not have the set of autonomous transportation instructions;

applying, by the one or more processors, a charging model to the container data of the one or more shipping containers to determine, for each of the one or more shipping containers and based upon whether the one of the one or more shipping containers includes the set of autonomous transportation instructions, (i) a charging prioritization, (ii) a respective charge value, the respective charge value indicating how much charge a power supply of each of the one or more shipping containers should receive, and (iii) a respective charging rate, and causing, by the one or more processors, each of the one or more shipping containers to receive the respective charge value at the respective charging rate in a sequential order based upon the charging prioritization for each of the one or more shipping containers.

2. The computer-implemented method of claim 1, wherein the charging model is a machine learning (ML) model configured to receive container data and output the charging prioritization, the respective charge value, and the respective charging rate, and the method further comprises:

training, by the one or more processors, the ML model using (i) a plurality of training container data, (ii) a plurality of training charging prioritizations, (iii) a plurality of training charge values, and (iv) a plurality of training charging rates; and applying, by the one or more processors, the ML model to the container data in order to output, for each of the one or more shipping containers, (i) the charging prioritization, (ii) the respective charge value, and (iii) the respective charging rate for each of the one or more shipping containers.

3. The computer-implemented method of claim 1, further comprising:

retrieving, by the one or more processors, container data for a set of shipping containers, wherein the container data for each shipping container includes (i) the power supply indication, (ii) a container weight value, (iii) a remaining travel distance value, (iv) an additional charging requirement indication, or (v) a delivery deadline value.

4. The computer-implemented method of claim 1, further comprising:

calculating, by the one or more processors executing the charging model, the respective charge value based upon a remaining travel distance value corresponding to a respective shipping container of the one or more shipping containers, wherein at least one respective charge value is less than a maximum capacity of a respective power supply.

5. The computer-implemented method of claim 1, further comprising:

retrieving, by the one or more processors, a set of travel data that includes (a) forecasted weather data, (b) real-time weather data, (c) forecasted traffic data, or (d) real-time traffic data; and applying, by the one or more processors, the charging model to the container data of the one or more shipping containers and the set of travel data to determine (i) the charging prioritization for each of the one or more shipping containers, (ii) the respective charge value for each of the one or more shipping containers, and (iii) the respective charging rate for each of the one or more shipping containers.

6. The computer-implemented method of claim 1, further comprising:

applying, by the one or more processors, the charging model to the container data of the one or more shipping containers to determine (i) the charging prioritization for each of the one or more shipping containers, (ii) the respective charge value for each of the one or more shipping containers, and (iii) the respective charging rate for each of the one or more shipping containers, wherein the respective charge value includes a buffer charge value configured to enable each of the one or more shipping containers to reach a respective destination without fully draining a respective power supply.

7. The computer-implemented method of claim 1, further comprising:

retrieving, by the one or more processors, a set of regional charging data for one or more charging regions that includes (a) a power generation method indication for each region, (b) a charging rate for each region, and (c) a charging cost for each region; and applying, by the one or more processors, the charging model to the container data of the one or more shipping containers and the set of regional charging data to determine (i) the charging prioritization for each of the one or more shipping containers, (ii) the respective charge value for each of the one or more shipping containers, (iii) the respective charging rate for each of the one or more shipping containers, and (iv) an optimal route for each of the one or more shipping containers.

8. The computer-implemented method of claim 1, further comprising:

retrieving, by the one or more processors, a set of transportation vehicle data based upon one or more transportation vehicles designated to transport shipping containers of the one or more shipping containers; and applying, by the one or more processors, the charging model to the container data of the one or more shipping containers and the set of transportation vehicle data to determine (i) the charging prioritization for each of the one or more shipping containers, (ii) the respective charge value for each of the one or more shipping containers, (iii) the respective charging rate for each of the one or more shipping containers, and (iv) a transportation configuration for each of the one or more shipping containers.

9. The computer-implemented method of claim 1, wherein applying the charging model further comprises:

determining, for each of the one or more shipping containers, a respective charge level indicating a total charge capacity percentage a power supply of each of the one or more shipping containers should reach.

10. A computing device for intelligent charging of shipping container power supplies, the computing device comprising:

one or more processors;

a networking interface; and a non-transitory computer-readable medium coupled to the one or more processors and the networking interface and storing instructions thereon that, when executed by the one or more processors, cause the computing device to:

retrieve container data for a set of shipping containers, wherein the container data for each shipping container includes a power supply indication, identify one or more shipping containers from the set of shipping containers, wherein the power supply indication for each of the one or more shipping containers indicates that the one or more shipping containers include a power supply, determine whether one of the one or more shipping containers includes a set of autonomous transportation instructions, and wherein the one of the one or more shipping containers that includes the set of autonomous transportation instructions receives a higher charging prioritization than the one or more shipping containers that do not have the set of autonomous transportation instructions, apply a charging model to the container data of the one or more shipping containers to determine, for each of the one or more shipping containers and based upon whether the one of the one or more shipping containers includes the set of autonomous transportation instructions, (i) a charging prioritization, (ii) a respective charge value, the respective charge value indicating how much charge a power supply of each of the one or more shipping containers should receive, and (iii) a respective charging rate, and cause each of the one or more shipping containers to receive the respective charge value at the respective charging rate in a sequential order based upon the charging prioritization for each of the one or more shipping containers.

11. The computing device of claim 10, wherein the charging model is a machine learning (ML) model configured to receive container data and output the charging prioritization, the respective charge value, and the respective charging rate, and the instructions, when executed by the one or more processors, further cause the computing device to:

train the ML model using (i) a plurality of training container data, (ii) a plurality of training charging prioritizations, (iii) a plurality of training charge values, and (iv) a plurality of training charging rates; and apply the ML model to the container data in order to output (i) the charging prioritization for each of the one or more shipping containers, (ii) the respective charge value for each of the one or more shipping containers, and (iii) the respective charging rate for each of the one or more shipping containers.

12. The computing device of claim 10, wherein the instructions, when executed by the one or more processors, further cause the computing device to:

retrieve container data for a set of shipping containers, wherein the container data for each shipping container includes (i) the power supply indication, (ii) a container weight value, (iii) a remaining travel distance value, (iv) an additional charging requirement indication, or (v) a delivery deadline value.

13. The computing device of claim 10, wherein the instructions, when executed by the one or more processors, further cause the computing device to:

calculate, by executing the charging model, the respective charge value based upon a remaining travel distance value corresponding to a respective shipping container of the one or more shipping containers, wherein at least one respective charge value is less than a maximum capacity of a respective power supply.

14. The computing device of claim 10, wherein the instructions, when executed by the one or more processors, further cause the computing device to:

retrieve a set of travel data that includes (a) forecasted weather data, (b) real-time weather data, (c) forecasted traffic data, or (d) real-time traffic data; and apply the charging model to the container data of the one or more shipping containers and the set of travel data to determine (i) the charging prioritization for each of the one or more shipping containers, (ii) the respective charge value for each of the one or more shipping containers, and (iii) the respective charging rate for each of the one or more shipping containers.

15. The computing device of claim 10, wherein the instructions, when executed by the one or more processors, further cause the computing device to:

apply the charging model to the container data of the one or more shipping containers to determine (i) the charging prioritization for each of the one or more shipping containers, (ii) the respective charge value for each of the one or more shipping containers, and (iii) the respective charging rate for each of the one or more shipping containers, wherein the respective charge value includes a buffer charge value configured to enable each of the one or more shipping containers to reach a respective destination without fully draining a respective power supply.

16. The computing device of claim 10, wherein the instructions, when executed by the one or more processors, further cause the computing device to:

retrieve a set of regional charging data for one or more charging regions that includes (a) a power generation method indication for each region, (b) a charging rate for each region, and (c) a charging cost for each region; and apply the charging model to the container data of the one or more shipping containers and the set of regional charging data to determine (i) the charging prioritization for each of the one or more shipping containers, (ii) the respective charge value for each of the one or more shipping containers, (iii) the respective charging rate for each of the one or more shipping containers, and (iv) an optimal route for each of the one or more shipping containers.

17. The computing device of claim 10, wherein the instructions, when executed by the one or more processors, further cause the computing device to:

retrieve a set of transportation vehicle data based upon one or more transportation vehicles designated to transport shipping containers of the one or more shipping containers; and apply the charging model to the container data of the one or more shipping containers and the set of transportation vehicle data to determine (i) the charging prioritization for each of the one or more shipping containers, (ii) the respective charge value for each of the one or more shipping containers, (iii) the respective charging rate for each of the one or more shipping containers, and (iv) a transportation configuration for each of the one or more shipping containers.

18. The computing device of claim 10, wherein the instructions, when executed by the one or more processors, further cause the computing device to apply the charging model by:

determining, for each of the one or more shipping containers, a respective charge level indicating a total charge capacity percentage a power supply of each of the one or more shipping containers should reach.

19. A tangible, non-transitory computer-readable medium storing instructions for intelligent charging of shipping container power supplies that, when executed by one or more processors of a computing device, cause the computing device to:

retrieve container data for a set of shipping containers, wherein the container data for each shipping container includes a power supply indication;

identify one or more shipping containers from the set of shipping containers, wherein the power supply indication for each of the one or more shipping containers indicates that the one or more shipping containers include a power supply;

determine whether one of the one or more shipping containers includes a set of autonomous transportation instructions, and wherein the one of the one or more shipping containers that includes the set of autonomous transportation instructions receives a higher charging prioritization than the one or more shipping containers that do not have the set of autonomous transportation instructions;

apply a charging model to the container data of the one or more shipping containers to determine, for each of the one or more shipping containers and based upon whether the one of the one or more shipping containers includes the set of autonomous transportation instructions, (i) a charging prioritization, (ii) a respective charge value, the respective charge value indicating how much charge a power supply of each of the one or more shipping containers should receive, and (iii) a respective charging rate, and cause each of the one or more shipping containers to receive the respective charge value at the respective charging rate in a sequential order based upon the charging prioritization for each of the one or more shipping containers.

20. The tangible, non-transitory computer-readable medium of claim 19, wherein the charging model is a machine learning (ML) model configured to receive container data and output the charging prioritization, the respective charge value, and the respective charging rate, and the instructions, when executed by the one or more processors, further cause the computing device to:

train the ML model using (i) a plurality of training container data, (ii) a plurality of training charging prioritizations, (iii) a plurality of training charge values, and (iv) a plurality of training charging rates; and apply the ML model to the container data in order to output (i) the charging prioritization for each of the one or more shipping containers, (ii) the respective charge value for each of the one or more shipping containers, and (iii) the respective charging rate for each of the one or more shipping containers.

* * * * *